(12) United States Patent
Stojanovski et al.

(10) Patent No.: US 12,713,286 B2
(45) Date of Patent: Aug. 18, 2026

(54) SDT AND CN BUFFERING CO-EXISTENCE IN INACTIVE STATE

(71) Applicant: Intel Corporation, Santa Clara, CA (US)

(72) Inventors: Alexandre Saso Stojanovski, Paris (FR); Jaemin Han, Portland, OR (US); Marta Martinez Tarradell, Hillsboro, OR (US); Thomas Luetzenkirchen, Taufkirchen (DE); Sudeep K. Palat, Cheltenham (GB)

(73) Assignee: Intel Corporation, Santa Clara, CA (US)

( * ) Notice: Subject to any disclaimer, the term of this patent is extended or adjusted under 35 U.S.C. 154(b) by 293 days.

(21) Appl. No.: 18/398,939

(22) Filed: Dec. 28, 2023

(65) Prior Publication Data

US 2024/0129790 A1 Apr. 18, 2024

Related U.S. Application Data

(60) Provisional application No. 63/493,513, filed on Mar. 31, 2023.

(51) Int. Cl.
*H04W 76/27* (2018.01)
*H04W 28/02* (2009.01)
*H04W 68/02* (2009.01)

(52) U.S. Cl.
CPC ... *H04W 28/0268* (2013.01); *H04W 28/0263* (2013.01); *H04W 68/02* (2013.01); *H04W 76/27* (2018.02)

(58) Field of Classification Search
CPC ............. H04W 28/0268; H04W 76/27; H04W 28/0263; H04W 68/02
USPC .......................................................... 370/230
See application file for complete search history.

(56) References Cited

U.S. PATENT DOCUMENTS

2011/0170517 A1* 7/2011 Bakker ............... H04W 36/125 370/328
2020/0100319 A1* 3/2020 Talebi Fard .......... H04W 76/32
2021/0337625 A1* 10/2021 Tsai .................... H04W 56/001
2021/0377844 A1* 12/2021 Tseng .................... H04W 48/10
2022/0015181 A1* 1/2022 Rönneke ............... H04W 76/27
2023/0180223 A1* 6/2023 Tseng .................. H04W 56/001 370/329
2023/0209504 A1* 6/2023 Agiwal ................. H04W 76/27 455/458

(Continued)

*Primary Examiner* — Albert Kir
(74) *Attorney, Agent, or Firm* — Schwegman Lundberg & Woessner, P.A.

(57) ABSTRACT

An apparatus and system are provided to enable the co-existence of small data transmission (SDT) and core network (CN) buffering when a user equipment (UE) is in an inactive state. A message transmitted from a user plane function (UPF) includes a Quality of Service (QoS) Flow Indicator (QFI) and data volume information (DVI) of buffered data in the UPF while the UE is in the inactive state. The QFI and DVI is provided to a next generation radio access network (NG-RAN). Based on the QFI and DVI, the RAN determines whether to page the UE for a mobile terminated SDT (MT-SDT) and whether to trigger connection resumption due to SDT. If connection resumption is triggered, the NG-RAN keeps the UE in the inactive state while an SDT session is initiated. At the end of the SDT session, the NG-RAN re-activates CN buffering.

20 Claims, 11 Drawing Sheets

(56) References Cited

U.S. PATENT DOCUMENTS

| | | | | |
|---|---|---|---|---|
| 2023/0328811 | A1* | 10/2023 | Kim | H04W 76/11 370/328 |
| 2025/0119771 | A1* | 4/2025 | Zhang | H04W 56/00 |
| 2025/0142530 | A1* | 5/2025 | Wei | H04W 28/0268 |
| 2025/0330284 | A1* | 10/2025 | Wu | H04L 5/0051 |

* cited by examiner

SDT AND CN BUFFERING CO-EXISTENCE IN INACTIVE STATE

PRIORITY CLAIM

This application claims the benefit of priority to U.S. Provisional Patent Application Ser. No. 63/493,513, filed Mar. 31, 2023, which is incorporated herein by reference in its entirety.

BACKGROUND

Mobile communication has evolved significantly from early voice systems to highly sophisticated integrated communication platform. Next-generation (NG) wireless communication systems, including $5^{th}$ generation (5G) and sixth generation (6G) or new radio (NR) systems, are to provide access to information and sharing of data by various users (e.g., user equipment (UEs)) and applications. NR is to be a unified network/system that is to meet vastly different and sometimes conflicting performance dimensions and services driven by different services and applications. As such the complexity of such communication systems has increased. As expected, a number of issues abound with the advent of any new technology, including complexities related to small data transmission (SDT) and interactions with the core network (CN).

BRIEF DESCRIPTION OF THE FIGURES

In the figures, which are not necessarily drawn to scale, like numerals may describe similar components in different views. Like numerals having different letter suffixes may represent different instances of similar components. The figures illustrate generally, by way of example, but not by way of limitation, various embodiments discussed in the present document.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1A:
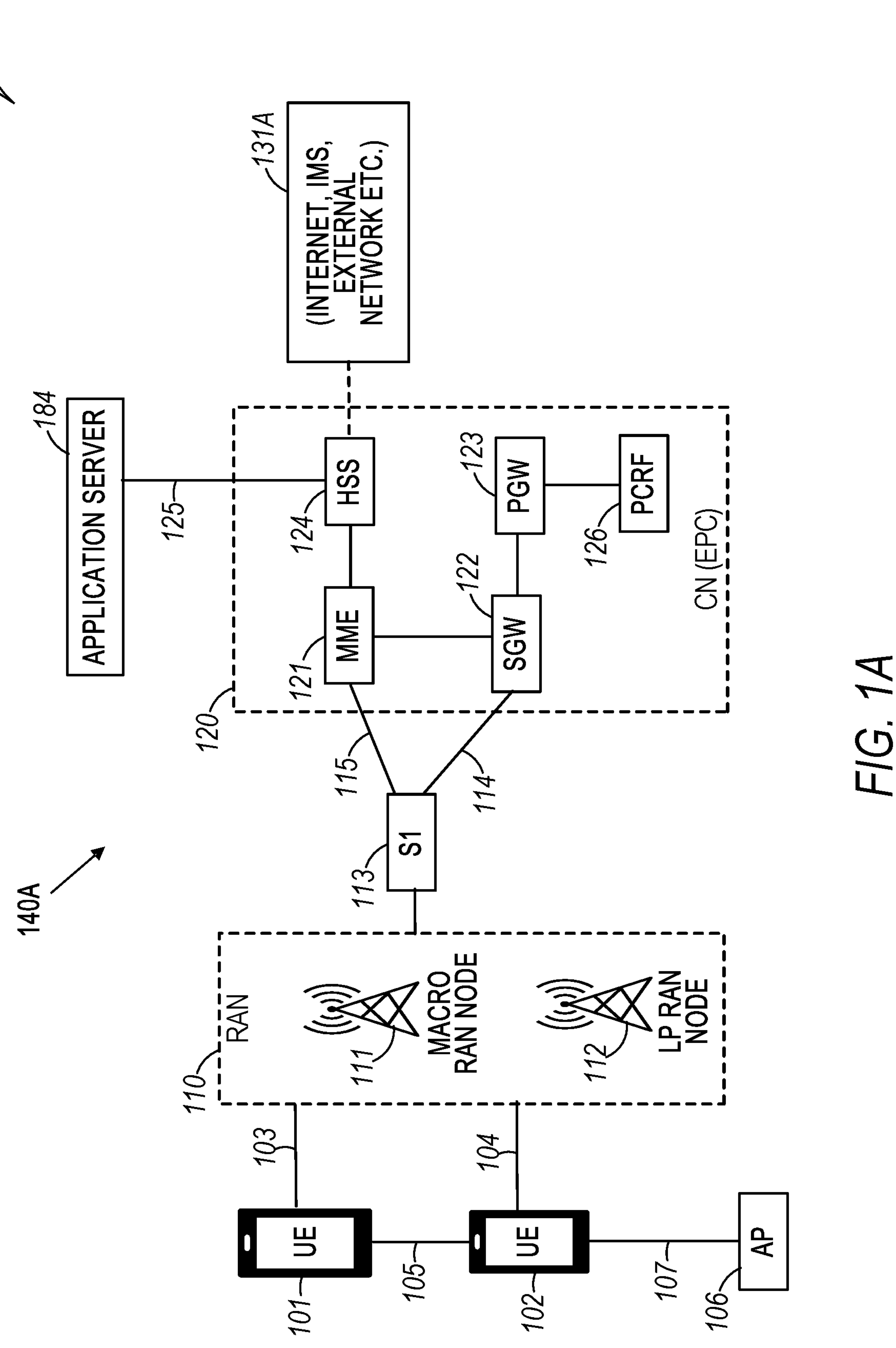
FIG. 1A illustrates an architecture of a network, in accordance with some aspects.

FIG. 1A illustrates an architecture of a network in accordance with some aspects. The network 140A includes 3GPP Long Term Evolution (LTE), $4^{th}$ generation (4G) and $5^{th}$ generation (5G) (or next generation (NG)) network functions that may be extended to 6G functions. Accordingly, although 5G will be referred to, it is to be understood that this is to extend as able to 6G structures, systems, and functions. A network function may be implemented as a discrete network element on a dedicated hardware, as a software instance running on dedicated hardware, and/or as a virtualized function instantiated on an appropriate platform, e.g., dedicated hardware or a cloud infrastructure.

The network 140A is shown to include user equipment (UE) 101 and UE 102. The UEs 101 and 102 are illustrated as smartphones (e.g., handheld touchscreen mobile computing devices connectable to one or more cellular networks) but may also include any mobile or non-mobile computing device, such as portable (laptop) or desktop computers, wireless handsets, drones, or any other computing device including a wired and/or wireless communications interface. The UEs 101 and 102 may be collectively referred to herein as UE 101, and UE 101 may be used to perform one or more of the techniques disclosed herein.

Any of the radio links described herein (e.g., as used in the network 140A or any other illustrated network) may operate according to any exemplary radio communication technology and/or standard. Any spectrum management scheme including, for example, dedicated licensed spectrum, unlicensed spectrum, (licensed) shared spectrum (such as Licensed Shared Access (LSA) in 2.3-2.4 GHz, 3.4-3.6 GHz, 3.6-3.8 GHz, and other frequencies and Spectrum Access System (SAS) in 3.55-3.7 GHz and other frequencies). Different Single Carrier or Orthogonal Frequency Domain Multiplexing (OFDM) modes (CP-OFDM, SC-FDMA, SC-OFDM, filter bank-based multicarrier (FBMC), OFDMA, etc.), and in particular 3GPP NR, may be used by allocating the OFDM carrier data bit vectors to the corresponding symbol resources.

In some aspects, any of the UEs 101 and 102 can comprise an Internet-of-Things (IoT) UE or a Cellular IoT (CIoT) UE, which can comprise a network access layer designed for low-power IoT applications utilizing short-lived UE connections. In some aspects, any of the UEs 101 and 102 can include a narrowband (NB) IoT UE (e.g., such as an enhanced NB-IoT (eNB-IoT) UE and Further Enhanced (FeNB-IoT) UE). An IoT UE can utilize technologies such as machine-to-machine (M2M) or machine-type communications (MTC) for exchanging data with an MTC server or device via a public land mobile network (PLMN), Proximity-Based Service (ProSe) or device-to-device (D2D) communication, sensor networks, or IoT networks. The M2M or MTC exchange of data may be a machine-initiated exchange of data. An IoT network includes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network. In some aspects, any of the UEs 101 and 102 can include enhanced MTC (eMTC) UEs or further enhanced MTC (FeMTC) UEs.

The UEs 101 and 102 may be configured to connect, e.g., communicatively couple, with a radio access network (RAN) 110. The RAN 110 may be, for example, an Evolved Universal Mobile Telecommunications System (UMTS) Terrestrial Radio Access Network (E-UTRAN), a NextGen RAN (NG RAN), or some other type of RAN.

The UEs 101 and 102 utilize connections 103 and 104, respectively, each of which comprises a physical communications interface or layer (discussed in further detail below); in this example, the connections 103 and 104 are illustrated as an air interface to enable communicative coupling, and may be consistent with cellular communications protocols, such as a Global System for Mobile Communications (GSM) protocol, a code-division multiple access (CDMA) network protocol, a Push-to-Talk (PTT) protocol, a PTT over Cellular (POC) protocol, a UMTS protocol, a 3GPP LTE protocol, a 5G protocol, a 6G protocol, and the like.

In an aspect, the UEs 101 and 102 may further directly exchange communication data via a ProSe interface 105. The ProSe interface 105 may alternatively be referred to as a sidelink (SL) interface comprising one or more logical channels, including but not limited to a Physical Sidelink Control Channel (PSCCH), a Physical Sidelink Shared Channel (PSSCH), a Physical Sidelink Discovery Channel (PSDCH), a Physical Sidelink Broadcast Channel (PSBCH), and a Physical Sidelink Feedback Channel (PSFCH).

The UE 102 is shown to be configured to access an access point (AP) 106 via connection 107. The connection 107 can comprise a local wireless connection, such as, for example, a connection consistent with any IEEE 802.11 protocol, according to which the AP 106 can comprise a wireless fidelity (WiFi®) router. In this example, the AP 106 is shown to be connected to the Internet without connecting to the core network of the wireless system (described in further detail below).

The RAN 110 can include one or more access nodes that enable the connections 103 and 104. These access nodes (ANs) may be referred to as base stations (BSs), NodeBs, evolved NodeBs (eNBs), 5$^{th}$ Generation NodeBs (gNBs), RAN nodes, and the like, and can comprise ground stations (e.g., terrestrial access points) or satellite stations providing coverage within a geographic area (e.g., a cell). In some aspects, the communication nodes 111 and 112 may be transmission/reception points (TRPs). In instances when the communication nodes 111 and 112 are NodeBs (e.g., eNBs or gNBs), one or more TRPs can function within the communication cell of the NodeBs. The RAN 110 may include one or more RAN nodes for providing macrocells, e.g., macro RAN node 111, and one or more RAN nodes for providing femtocells or picocells (e.g., cells having smaller coverage areas, smaller user capacity, or higher bandwidth compared to macrocells), e.g., low power (LP) RAN node 112.

Any of the RAN nodes 111 and 112 can terminate the air interface protocol and may be the first point of contact for the UEs 101 and 102. In some aspects, any of the RAN nodes 111 and 112 can fulfill various logical functions for the RAN 110 including, but not limited to, radio network controller (RNC) functions such as radio bearer management, uplink and downlink dynamic radio resource management and data packet scheduling, and mobility management. In an example, any of the nodes 111 and/or 112 may be a gNB, an eNB, or another type of RAN node.

The RAN 110 is shown to be communicatively coupled to a core network (CN) 120 via an S1 interface 113. In aspects, the CN 120 may be an evolved packet core (EPC) network, a NextGen Packet Core (NPC) network, or some other type of CN (e.g., as illustrated in reference to FIGS. 1B-1C). In this aspect, the S1 interface 113 is split into two parts: the S1-U interface 114, which carries traffic data between the RAN nodes 111 and 112 and the serving gateway (S-GW) 122, and the S1-mobility management entity (MME) interface 115, which is a signaling interface between the RAN nodes 111 and 112 and MMEs 121.

In this aspect, the CN 120 comprises the MMEs 121, the S-GW 122, the Packet Data Network (PDN) Gateway (P-GW) 123, and a home subscriber server (HSS) 124. The MMEs 121 may be similar in function to the control plane of legacy Serving General Packet Radio Service (GPRS) Support Nodes (SGSN). The MMEs 121 may manage mobility aspects in access such as gateway selection and tracking area list management. The HSS 124 may comprise a database for network users, including subscription-related information to support the network entities' handling of communication sessions. The CN 120 may comprise one or several HSSs 124, depending on the number of mobile subscribers, on the capacity of the equipment, on the organization of the network, etc. For example, the HSS 124 can provide support for routing/roaming, authentication, authorization, naming/addressing resolution, location dependencies, etc.

The S-GW 122 may terminate the 51 interface 113 towards the RAN 110, and routes data packets between the RAN 110 and the CN 120. In addition, the S-GW 122 may be a local mobility anchor point for inter-RAN node handovers and also may provide an anchor for inter-3GPP mobility. Other responsibilities of the S-GW 122 may include a lawful intercept, charging, and some policy enforcement.

The P-GW 123 may terminate an SGi interface toward a PDN. The P-GW 123 may route data packets between the CN 120 and external networks such as a network including the application server 184 (alternatively referred to as application function (AF)) via an Internet Protocol (IP) interface 125. The P-GW 123 can also communicate data to other external networks 131A, which can include the Internet, IP multimedia subsystem (IPS) network, and other networks. Generally, the application server 184 may be an element offering applications that use IP bearer resources with the core network (e.g., UMTS Packet Services (PS) domain, LTE PS data services, etc.). In this aspect, the P-GW 123 is shown to be communicatively coupled to an application server 184 via an IP interface 125. The application server 184 can also be configured to support one or more communication services (e.g., Voice-over-Internet Protocol (VoIP) sessions, PTT sessions, group communication sessions, social networking services, etc.) for the UEs 101 and 102 via the CN 120.

The P-GW 123 may further be a node for policy enforcement and charging data collection. Policy and Charging Rules Function (PCRF) 126 is the policy and charging control element of the CN 120. In a non-roaming scenario, in some aspects, there may be a single PCRF in the Home Public Land Mobile Network (HPLMN) associated with a UE's Internet Protocol Connectivity Access Network (IP-CAN) session. In a roaming scenario with a local breakout of traffic, there may be two PCRFs associated with a UE's IP-CAN session: a Home PCRF (H-PCRF) within an HPLMN and a Visited PCRF (V-PCRF) within a Visited Public Land Mobile Network (VPLMN). The PCRF 126 may be communicatively coupled to the application server 184 via the P-GW 123.

In some aspects, the communication network 140A may be an IoT network or a 5G or 6G network, including 5G new radio network using communications in the licensed (5G NR) and the unlicensed (5G NR-U) spectrum. One of the current enablers of IoT is the narrowband-IoT (NB-IoT). Operation in the unlicensed spectrum may include dual connectivity (DC) operation and the standalone LTE system in the unlicensed spectrum, according to which LTE-based technology solely operates in unlicensed spectrum without the use of an "anchor" in the licensed spectrum, called MulteFire. Further enhanced operation of LTE systems in the licensed as well as unlicensed spectrum is expected in future releases and 5G systems. Such enhanced operations can include techniques for sidelink resource allocation and UE processing behaviors for NR sidelink V2X communications.

An NG system architecture (or 6G system architecture) can include the RAN 110 and a 5G core network (5GC) 120. The NG-RAN 110 can include a plurality of nodes, such as gNBs and NG-eNBs. The CN 120 (e.g., a 5G core network/5GC) can include an access and mobility function (AMF) and/or a user plane function (UPF). The AMF and the UPF may be communicatively coupled to the gNBs and the NG-eNBs via NG interfaces. More specifically, in some aspects, the gNBs and the NG-eNBs may be connected to the AMF by NG-C interfaces, and to the UPF by NG-U interfaces. The gNBs and the NG-eNBs may be coupled to each other via Xn interfaces.

In some aspects, the NG system architecture can use reference points between various nodes. In some aspects, each of the gNBs and the NG-eNBs may be implemented as a base station, a mobile edge server, a small cell, a home eNB, and so forth. In some aspects, a gNB may be a primary node (MN) and NG-eNB may be a secondary node (SN) in a 5G architecture.

Figure 1B:
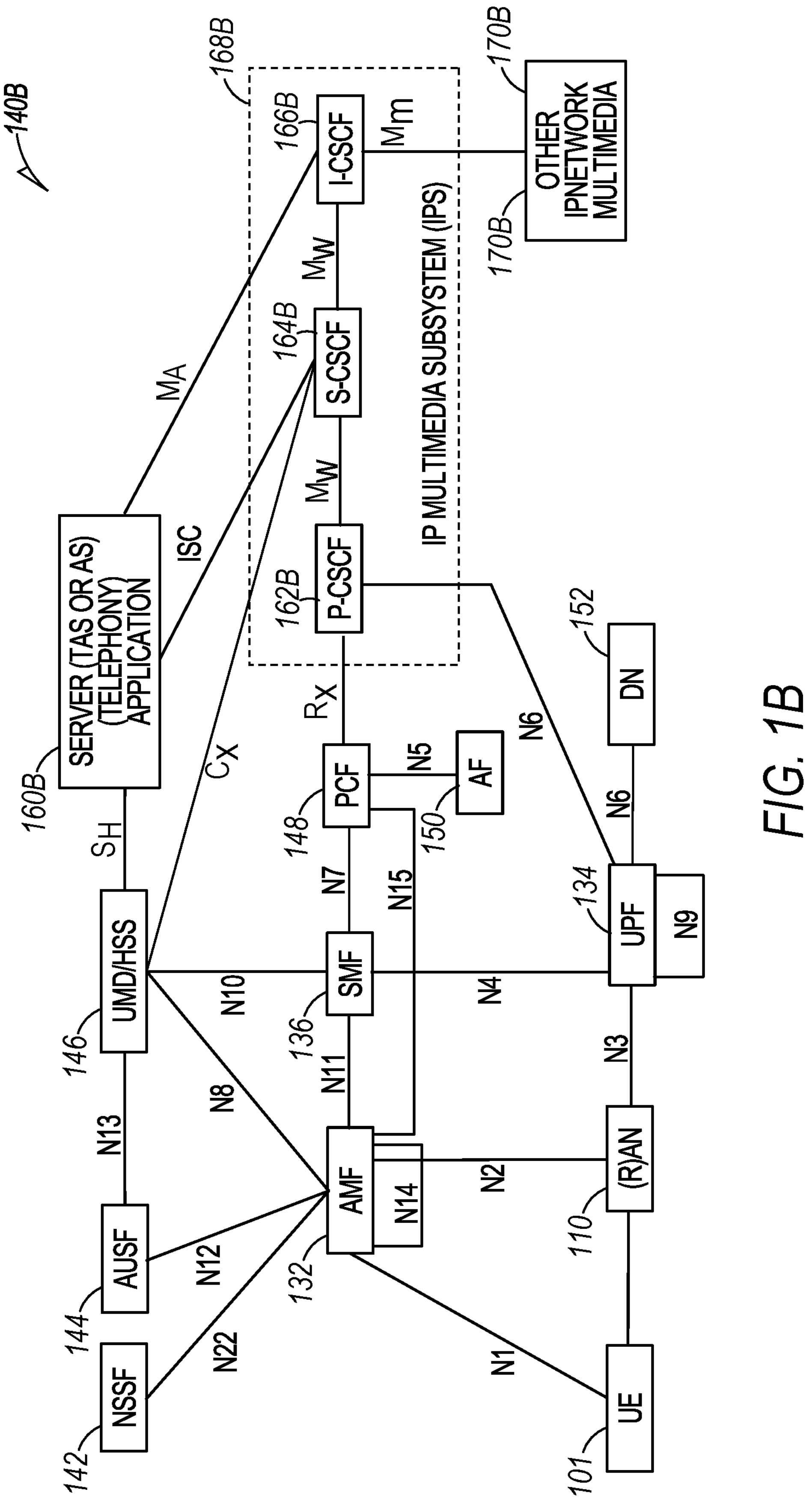
FIG. 1B illustrates a non-roaming 5G system architecture in accordance with some aspects.

FIG. 1B illustrates a non-roaming 5G system architecture in accordance with some aspects. In particular, FIG. 1B illustrates a 5G system architecture 140B in a reference point representation, which may be extended to a 6G system architecture. More specifically, UE 102 may be in communication with RAN 110 as well as one or more other 5GC network entities. The 5G system architecture 140B includes a plurality of network functions (NFs), such as an AMF 132, session management function (SMF) 136, policy control function (PCF) 148, application function (AF) 150, UPF 134, network slice selection function (NSSF) 142, authentication server function (AUSF) 144, and unified data management (UDM)/home subscriber server (HSS) 146.

The UPF 134 can provide a connection to a data network (DN) 152, which can include, for example, operator services, Internet access, or third-party services. The AMF 132 may be used to manage access control and mobility and can also include network slice selection functionality. The AMF 132 may provide UE-based authentication, authorization, mobility management, etc., and may be independent of the access technologies. The SMF 136 may be configured to set up and manage various sessions according to network policy. The SMF 136 may thus be responsible for session management and allocation of IP addresses to UEs. The SMF 136 may also select and control the UPF 134 for data transfer. The SMF 136 may be associated with a single session of a UE 101 or multiple sessions of the UE 101. This is to say that the UE 101 may have multiple 5G sessions. Different SMFs may be allocated to each session. The use of different SMFs may permit each session to be individually managed. As a consequence, the functionalities of each session may be independent of each other.

The UPF 134 may be deployed in one or more configurations according to the desired service type and may be connected with a data network. The PCF 148 may be configured to provide a policy framework using network slicing, mobility management, and roaming (similar to PCRF in a 4G communication system). The UDM may be configured to store subscriber profiles and data (similar to an HSS in a 4G communication system).

The AF 150 may provide information on the packet flow to the PCF 148 responsible for policy control to support a desired QoS. The PCF 148 may set mobility and session management policies for the UE 101. To this end, the PCF 148 may use the packet flow information to determine the appropriate policies for proper operation of the AMF 132 and SMF 136. The AUSF 144 may store data for UE authentication.

In some aspects, the 5G system architecture 140B includes an IP multimedia subsystem (IMS) 168B as well as a plurality of IP multimedia core network subsystem entities, such as call session control functions (CSCFs). More specifically, the IMS 168B includes a CSCF, which can act as a proxy CSCF (P-CSCF) 162B, a serving CSCF (S-CSCF) 164B, an emergency CSCF (E-CSCF) (not illustrated in FIG. 1B), or interrogating CSCF (I-CSCF) 166B. The P-CSCF 162B may be configured to be the first contact point for the UE 102 within the IM subsystem (IMS) 168B. The S-CSCF 164B may be configured to handle the session states in the network, and the E-CSCF may be configured to handle certain aspects of emergency sessions such as routing an emergency request to the correct emergency center or PSAP. The I-CSCF 166B may be configured to function as the contact point within an operator's network for all IMS connections destined to a subscriber of that network operator, or a roaming subscriber currently located within that network operator's service area. In some aspects, the I-CSCF 166B may be connected to another IP multimedia network 170B, e.g., an IMS operated by a different network operator.

In some aspects, the UDM/HSS 146 may be coupled to an application server 184, which can include a telephony application server (TAS) or another application server (AS) 160B. The AS 160B may be coupled to the IMS 168B via the S-CSCF 164B or the I-CSCF 166B.

A reference point representation shows that interaction can exist between corresponding NF services. For example, FIG. 1B illustrates the following reference points: N1 (between the UE 102 and the AMF 132), N2 (between the RAN 110 and the AMF 132), N3 (between the RAN 110 and the UPF 134), N4 (between the SMF 136 and the UPF 134), N5 (between the PCF 148 and the AF 150, not shown), N6 (between the UPF 134 and the DN 152), N7 (between the SMF 136 and the PCF 148, not shown), N8 (between the UDM 146 and the AMF 132, not shown), N9 (between two UPFs 134, not shown), N10 (between the UDM 146 and the SMF 136, not shown), N11 (between the AMF 132 and the SMF 136, not shown), N12 (between the AUSF 144 and the AMF 132, not shown), N13 (between the AUSF 144 and the UDM 146, not shown), N14 (between two AMFs 132, not shown), N15 (between the PCF 148 and the AMF 132 in case of a non-roaming scenario, or between the PCF 148 and a visited network and AMF 132 in case of a roaming scenario, not shown), N16 (between two SMFs, not shown), and N22 (between AMF 132 and NSSF 142, not shown). Other reference point representations not shown in FIG. 1B can also be used.

Figure 1C:
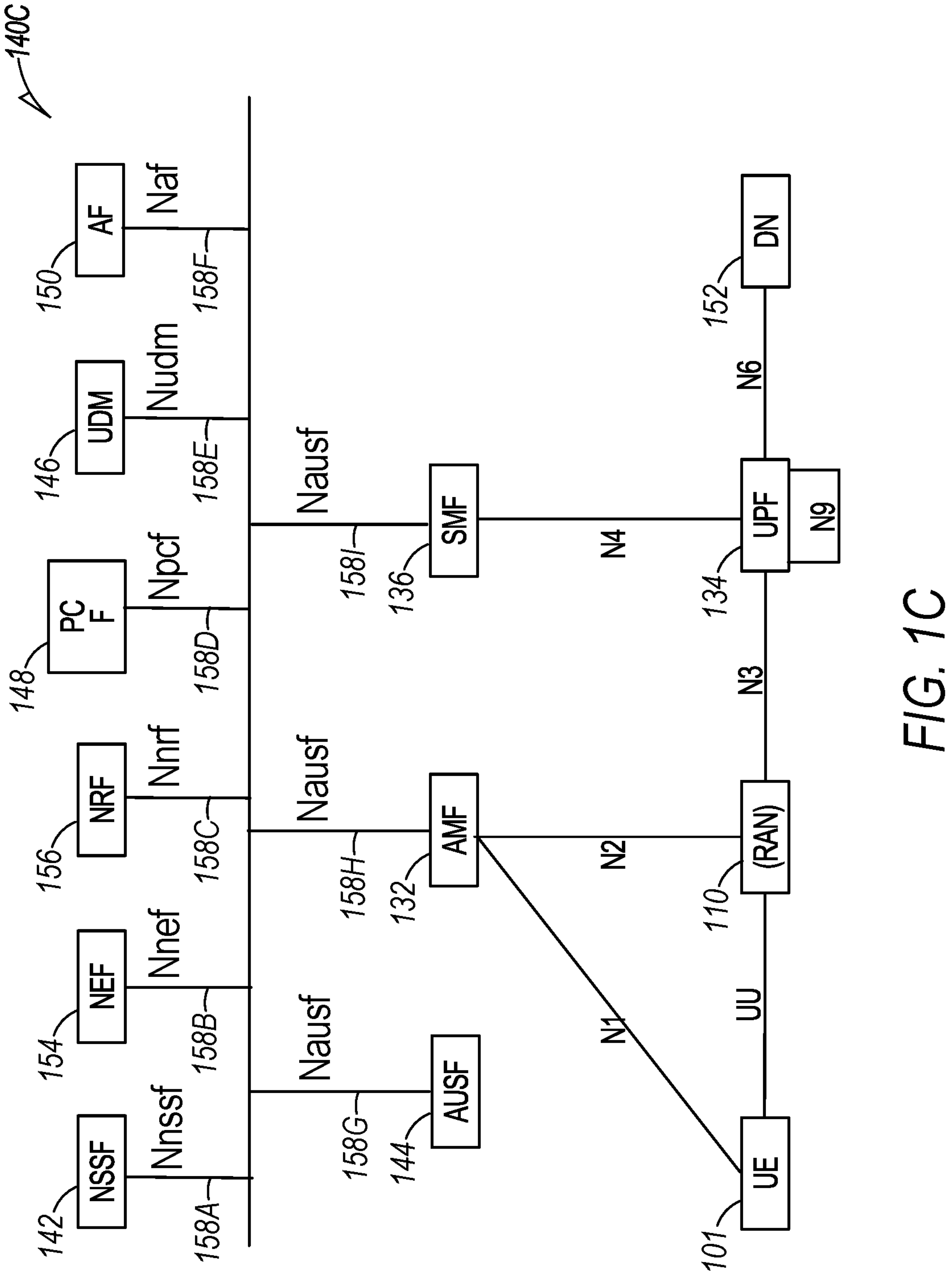
FIG. 1C illustrates a non-roaming 5G system architecture in accordance with some aspects.

FIG. 1C illustrates a 5G system architecture 140C and a service-based representation. In addition to the network entities illustrated in FIG. 1B, system architecture 140C can also include a network exposure function (NEF) 154 and a network repository function (NRF) 156. In some aspects, 5G system architectures may be service-based and interaction between network functions may be represented by corresponding point-to-point reference points Ni or as service-based interfaces.

In some aspects, as illustrated in FIG. 1C, service-based representations may be used to represent network functions within the control plane that enable other authorized network functions to access their services. In this regard, 5G system architecture 140C can include the following service-based interfaces: Namf 158H (a service-based interface exhibited by the AMF 132), Nsmf 158I (a service-based interface exhibited by the SMF 136), Nnef 158B (a service-based interface exhibited by the NEF 154), Npcf 158D (a service-based interface exhibited by the PCF 148), a Nudm 158E (a service-based interface exhibited by the UDM 146), Naf 158F (a service-based interface exhibited by the AF 150), Nnrf 158C (a service-based interface exhibited by the NRF 156), Nnssf 158A (a service-based interface exhibited by the NSSF 142), Nausf 158G (a service-based interface exhibited by the AUSF 144). Other service-based interfaces (e.g., Nudr, N5g-eir, and Nudsf) not shown in FIG. 1C can also be used.

NR-V2X architectures may support high-reliability low latency sidelink communications with a variety of traffic patterns, including periodic and aperiodic communications with random packet arrival time and size. Techniques disclosed herein may be used for supporting high reliability in distributed communication systems with dynamic topologies, including sidelink NR V2X communication systems.

Figure 2:
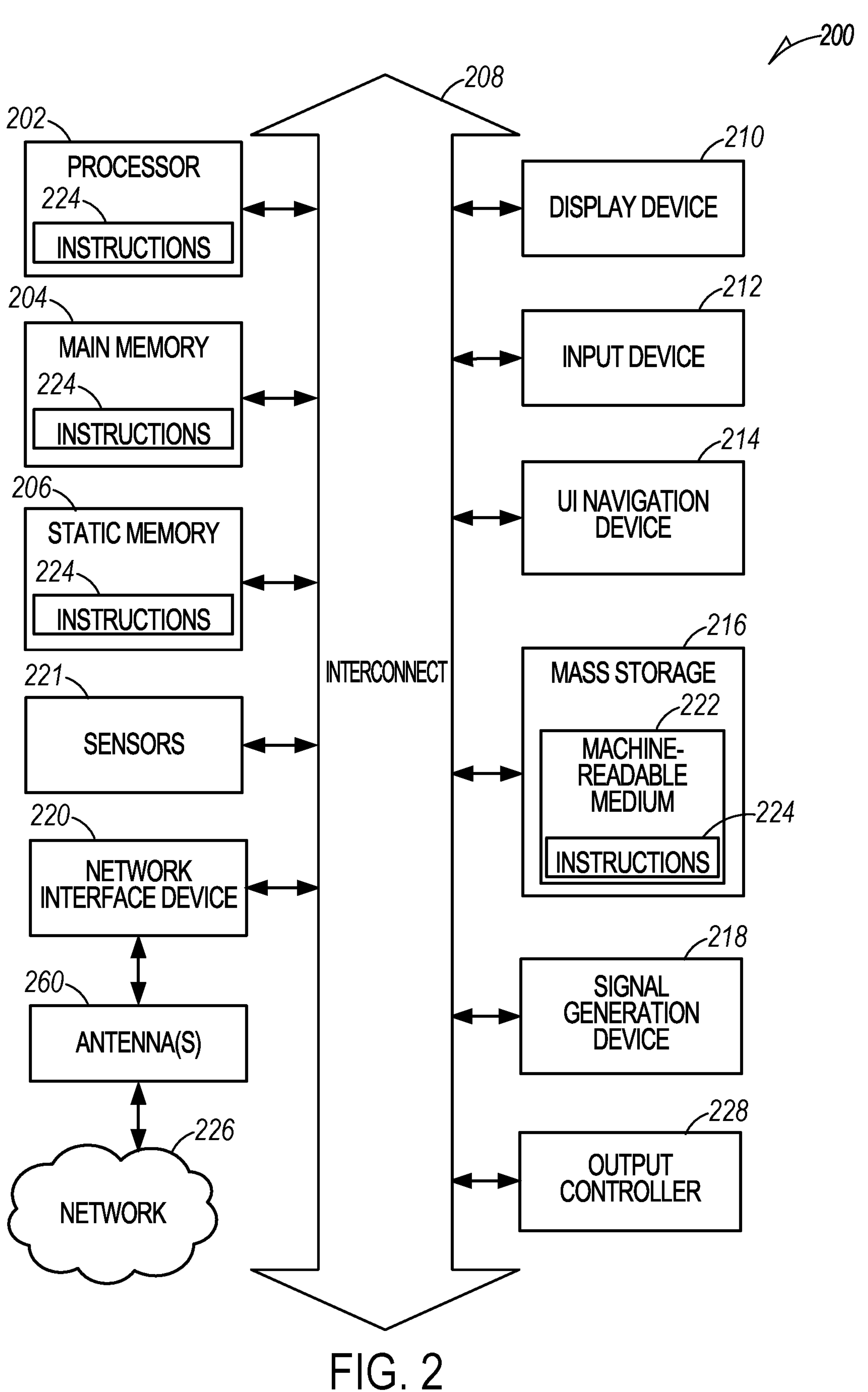
FIG. 2 illustrates a block diagram of a communication device in accordance with some aspects.

FIG. 2 illustrates a block diagram of a communication device in accordance with some embodiments. The communication device 200 may be a UE such as a specialized computer, a personal or laptop computer (PC), a tablet PC, or a smart phone, dedicated network equipment such as an eNB, a server running software to configure the server to operate as a network device, a virtual device, or any machine capable of executing instructions (sequential or otherwise) that specify actions to be taken by that machine. For example, the communication device 200 may be implemented as one or more of the devices shown in FIGS. 1A-1C. Note that communications described herein may be encoded before transmission by the transmitting entity (e.g., UE, gNB) for reception by the receiving entity (e.g., gNB, UE) and decoded after reception by the receiving entity.

Examples, as described herein, may include, or may operate on, logic or a number of components, modules, or mechanisms. Modules and components are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine-readable medium. In an example, the software, when executed by the underlying hardware of the module, causes the hardware to perform the specified operations.

Accordingly, the term "module" (and "component") is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

The communication device 200 may include a hardware processor (or equivalently processing circuitry) 202 (e.g., a central processing unit (CPU), a GPU, a hardware processor core, or any combination thereof), a main memory 204 and a static memory 206, some or all of which may communicate with each other via an interlink (e.g., bus) 208. The main memory 204 may contain any or all of removable storage and non-removable storage, volatile memory or non-volatile memory. The communication device 200 may further include a display unit 210 such as a video display, an alphanumeric input device 212 (e.g., a keyboard), and a user interface (UI) navigation device 214 (e.g., a mouse). In an example, the display unit 210, input device 212 and UI navigation device 214 may be a touch screen display. The communication device 200 may additionally include a storage device (e.g., drive unit) 216, a signal generation device 218 (e.g., a speaker), a network interface device 220, and one or more sensors, such as a global positioning system (GPS) sensor, compass, accelerometer, or another sensor. The communication device 200 may further include an output controller, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 216 may include a non-transitory machine readable medium 222 (hereinafter simply referred to as machine readable medium) on which is stored one or more sets of data structures or instructions 224 (e.g., software) embodying or utilized by any one or more of the techniques or functions described herein. The non-transitory machine readable medium 222 is a tangible medium. The instructions 224 may also reside, completely or at least partially, within the main memory 204, within static memory 206, and/or within the hardware processor 202 during execution thereof by the communication device 200. While the machine readable medium 222 is illustrated as a single medium, the term "machine readable medium" may include a single medium or multiple media (e.g., a centralized or distributed database, and/or associated caches and servers) configured to store the one or more instructions 224.

The term "machine readable medium" may include any medium that is capable of storing, encoding, or carrying instructions for execution by the communication device 200 and that cause the communication device 200 to perform any one or more of the techniques of the present disclosure, or that is capable of storing, encoding or carrying data structures used by or associated with such instructions. Non-limiting machine-readable medium examples may include solid-state memories, and optical and magnetic media. Specific examples of machine-readable media may include non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); and CD-ROM and DVD-ROM disks.

The instructions 224 may further be transmitted or received over a communications network using a transmission medium 226 via the network interface device 220 utilizing any one of a number of wireless local area network (WLAN) transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks. Communications over the networks may include one or more different protocols, such as IEEE 802.11 family of standards known as Wi-Fi, IEEE 802.16 family of standards known as WiMax, IEEE 802.15.4 family of standards, an LTE family of standards, a UMTS family of standards, peer-to-peer (P2P) networks, a 5G standards among others. In an example, the network interface device 220 may include one or more physical jacks (e.g., Ethernet, coaxial, or phone jacks) or one or more antennas to connect to the transmission medium 226.

Note that the term "circuitry" as used herein refers to, is part of, or includes hardware components such as an electronic circuit, a logic circuit, a processor (shared, dedicated, or group) and/or memory (shared, dedicated, or group), an Application Specific Integrated Circuit (ASIC), a field-programmable device (FPD) (e.g., a field-programmable gate array (FPGA), a programmable logic device (PLD), a complex PLD (CPLD), a high-capacity PLD (HCPLD), a structured ASIC, or a programmable SoC), digital signal processors (DSPs), etc., that are configured to provide the described functionality. In some embodiments, the circuitry may execute one or more software or firmware programs to provide at least some of the described functionality. The term "circuitry" may also refer to a combination of one or more hardware elements (or a combination of circuits used in an electrical or electronic system) with the program code used to carry out the functionality of that program code. In these embodiments, the combination of hardware elements and program code may be referred to as a particular type of circuitry.

The term "processor circuitry" or "processor" as used herein thus refers to, is part of, or includes circuitry capable of sequentially and automatically carrying out a sequence of arithmetic or logical operations, or recording, storing, and/or transferring digital data. The term "processor circuitry" or "processor" may refer to one or more application processors, one or more baseband processors, a physical central processing unit (CPU), a single- or multi-core processor, and/or any other device capable of executing or otherwise operating computer-executable instructions, such as program code, software modules, and/or functional processes.

Any of the radio links described herein may operate according to any one or more of the following radio communication technologies and/or standards including but not limited to: a GSM radio communication technology, a GPRS radio communication technology, an Enhanced Data Rates for GSM Evolution (EDGE) radio communication technology, and/or a Third Generation Partnership Project (3GPP) radio communication technology, for example UMTS, Freedom of Multimedia Access (FOMA), 3GPP LTE, 3GPP Long Term Evolution Advanced (LTE Advanced), Code division multiple access 2000 (CDMA2000), Cellular Digital Packet Data (CDPD), Mobitex, Third Generation (3G), Circuit Switched Data (CSD), High-Speed Circuit-Switched Data (HSCSD), UMTS (3G), Wideband Code Division Multiple Access (UMTS) (W-CDMA (UMTS)), High Speed Packet Access (HSPA), High-Speed Downlink Packet Access (HSDPA), High-Speed Uplink Packet Access (HSUPA), High Speed Packet Access Plus (HSPA+), UMTS-Time-Division Duplex (UMTS-TDD), TD-CDMA, Time Division-Synchronous Code Division Multiple Access, 3rd Generation Partnership Project Release 8 (Pre-4th Generation) (3GPP Rel. 8 (Pre-4G)), 3GPP Rel. 9 (3rd Generation Partnership Project Release 9), 3GPP Rel. 10 (3rd Generation Partnership Project Release 10), 3GPP Rel. 11 (3rd Generation Partnership Project Release 11), 3GPP Rel. 12 (3rd Generation Partnership Project Release 12), 3GPP Rel. 13 (3rd Generation Partnership Project Release 13), 3GPP Rel. 14 (3rd Generation Partnership Project Release 14), 3GPP Rel. 15 (3rd Generation Partnership Project Release 15), 3GPP Rel. 16 (3rd Generation Partnership Project Release 16), 3GPP Rel. 17 (3rd Generation Partnership Project Release 17) and subsequent Releases (such as Rel. 18, Rel. 19, etc.), 3GPP 5G, 5G, 5G New Radio (5G NR), 3GPP 5G New Radio, 3GPP LTE Extra, LTE-Advanced Pro, LTE Licensed-Assisted Access (LAA), MuLTEfire, UMTS Terrestrial Radio Access (UTRA), E-UTRA, LTE Advanced (4G), cdmaOne (2G), Code division multiple access 2000 (Third generation) (CDMA2000 (3G)), Evolution-Data Optimized or Evolution-Data Only (EV-DO), Advanced Mobile Phone System (1st Generation) (AMPS (1G)), Total Access Communication System/Extended Total Access Communication System (TACS/ETACS), Digital AMPS (2nd Generation) (D-AMPS (2G)), PTT, Mobile Telephone System (MTS), Improved Mobile Telephone System (WITS), Advanced Mobile Telephone System (AMTS), OLT (Norwegian for Offentlig Landmobil Telefoni, Public Land Mobile Telephony), MTD (Swedish abbreviation for Mobiltelefonisystem D, or Mobile telephony system D), Public Automated Land Mobile (Autotel/PALM), ARP (Finnish for Autoradiopuhelin, "car radio phone"), NMT (Nordic Mobile Telephony), High capacity version of NTT (Nippon Telegraph and Telephone) (Hicap), Cellular Digital Packet Data (CDPD), Mobitex, DataTAC, Integrated Digital Enhanced Network (iDEN), Personal Digital Cellular (PDC), Circuit Switched Data (CSD), Personal Handy-phone System (PHS), Wideband Integrated Digital Enhanced Network (WiDEN), iBurst, Unlicensed Mobile Access (UMA), also referred to as 3GPP Generic Access Network, or GAN standard), Zigbee, Bluetooth(r), Wireless Gigabit Alliance (WiGig) standard, mmWave standards in general (wireless systems operating at 10-300 GHz and above such as WiGig, IEEE 802.11ad, IEEE 802.11ay, etc.), technologies operating above 300 GHz and THz bands, (3GPP/LTE based or IEEE 802.11p or IEEE 802.11bd and other) Vehicle-to-Vehicle (V2V) and Vehicle-to-X (V2X) and Vehicle-to-Infrastructure (V2I) and Infrastructure-to-Vehicle (I2V) communication technologies, 3GPP cellular V2X, Dedicated Short Range Communications (DSRC) communication systems such as Intelligent-Transport-Systems and others (typically operating in 5850 MHz to 5925

MHz or above (typically up to 5935 MHz following change proposals in CEPT Report 71)), the European ITS-G5 system (i.e. the European flavor of IEEE 802.11p based DSRC, including ITS-G5A (i.e., Operation of ITS-G5 in European ITS frequency bands dedicated to ITS for safety related applications in the frequency range 5,875 GHz to 5,905 GHz), ITS-G5B (i.e., Operation in European ITS frequency bands dedicated to ITS non-safety applications in the frequency range 5,855 GHz to 5,875 GHz), ITS-G5C (i.e., Operation of ITS applications in the frequency range 5,470 GHz to 5,725 GHz)), DSRC in Japan in the 700 MHz band (including 715 MHz to 725 MHz), IEEE 802.11bd based systems, etc.

Aspects described herein may be used in the context of any spectrum management scheme including dedicated licensed spectrum, unlicensed spectrum, license exempt spectrum, (licensed) shared spectrum (such as LSA=Licensed Shared Access in 2.3-2.4 GHz, 3.4-3.6 GHz, 3.6-3.8 GHz and further frequencies and SAS=Spectrum Access System/CBRS=Citizen Broadband Radio System in 3.55-3.7 GHz and further frequencies). Applicable spectrum bands include International Mobile Telecommunications spectrum as well as other types of spectrum/bands, such as bands with national allocation (including 450-470 MHz, 902-928 MHz (note: allocated for example in US (FCC Part 15)), 863-868.6 MHz (note: allocated for example in European Union (ETSI EN 300 220)), 915.9-929.7 MHz (note: allocated for example in Japan), 917-923.5 MHz (note: allocated for example in South Korea), 755-779 MHz and 779-787 MHz (note: allocated for example in China), 790-960 MHz, 1710-2025 MHz, 2110-2200 MHz, 2300-2400 MHz, 2.4-2.4835 GHz (note: it is an ISM band with global availability and it is used by Wi-Fi technology family (11b/g/n/ax) and also by Bluetooth), 2500-2690 MHz, 698-790 MHz, 610-790 MHz, 3400-3600 MHz, 3400-3800 MHz, 3800-4200 MHz, 3.55-3.7 GHz (note: allocated for example in the US for Citizen Broadband Radio Service), 5.15-5.25 GHz and 5.25-5.35 GHz and 5.47-5.725 GHz and 5.725-5.85 GHz bands (note: allocated for example in the US (FCC part 15), consists four U-NII bands in total 500 MHz spectrum), 5.725-5.875 GHz (note: allocated for example in EU (ETSI EN 301 893)), 5.47-5.65 GHz (note: allocated for example in South Korea, 5925-7125 MHz and 5925-6425 MHz band (note: under consideration in US and EU, respectively. Next generation Wi-Fi system is expected to include the 6 GHz spectrum as operating band, but it is noted that, as of December 2017, Wi-Fi system is not yet allowed in this band. Regulation is expected to be finished in 2019-2020 time frame), IMT-advanced spectrum, IMT-2020 spectrum (expected to include 3600-3800 MHz, 3800-4200 MHz, 3.5 GHz bands, 700 MHz bands, bands within the 24.25-86 GHz range, etc.), spectrum made available under FCC's "Spectrum Frontier" 5G initiative (including 27.5-28.35 GHz, 29.1-29.25 GHz, 31-31.3 GHz, 37-38.6 GHz, 38.6-40 GHz, 42-42.5 GHz, 57-64 GHz, 71-76 GHz, 81-86 GHz and 92-94 GHz, etc.), the ITS (Intelligent Transport Systems) band of 5.9 GHz (typically 5.85-5.925 GHz) and 63-64 GHz, bands currently allocated to WiGig such as WiGig Band 1 (57.24-59.40 GHz), WiGig Band 2 (59.40-61.56 GHz) and WiGig Band 3 (61.56-63.72 GHz) and WiGig Band 4 (63.72-65.88 GHz), 57-64/66 GHz (note: this band has near-global designation for Multi-Gigabit Wireless Systems (MGWS)/WiGig. In US (FCC part 15) allocates total 14 GHz spectrum, while EU (ETSI EN 302 567 and ETSI EN 301 217-2 for fixed P2P) allocates total 9 GHz spectrum), the 70.2 GHz-71 GHz band, any band between 65.88 GHz and 71 GHz, bands currently allocated to automotive radar applications such as 76-81 GHz, and future bands including 94-300 GHz and above. Furthermore, the scheme may be used on a secondary basis on bands such as the TV White Space bands (typically below 790 MHz) where in particular the 400 MHz and 700 MHz bands are promising candidates. Besides cellular applications, specific applications for vertical markets may be addressed such as Program Making and Special Events (PMSE), medical, health, surgery, automotive, low-latency, drones, etc. applications.

As above, as part of their Release 18, support for CN buffering for a UE in a Radio Resource Control (RRC)_ Inactive state has been initiated. The CN state corresponding to a UE in RRC_Inactive state is the CM_Connected state, meaning that any downlink data arriving at the UPF should be transparently forwarded to the RAN, rather than being buffered in the CN.

Figure 3:
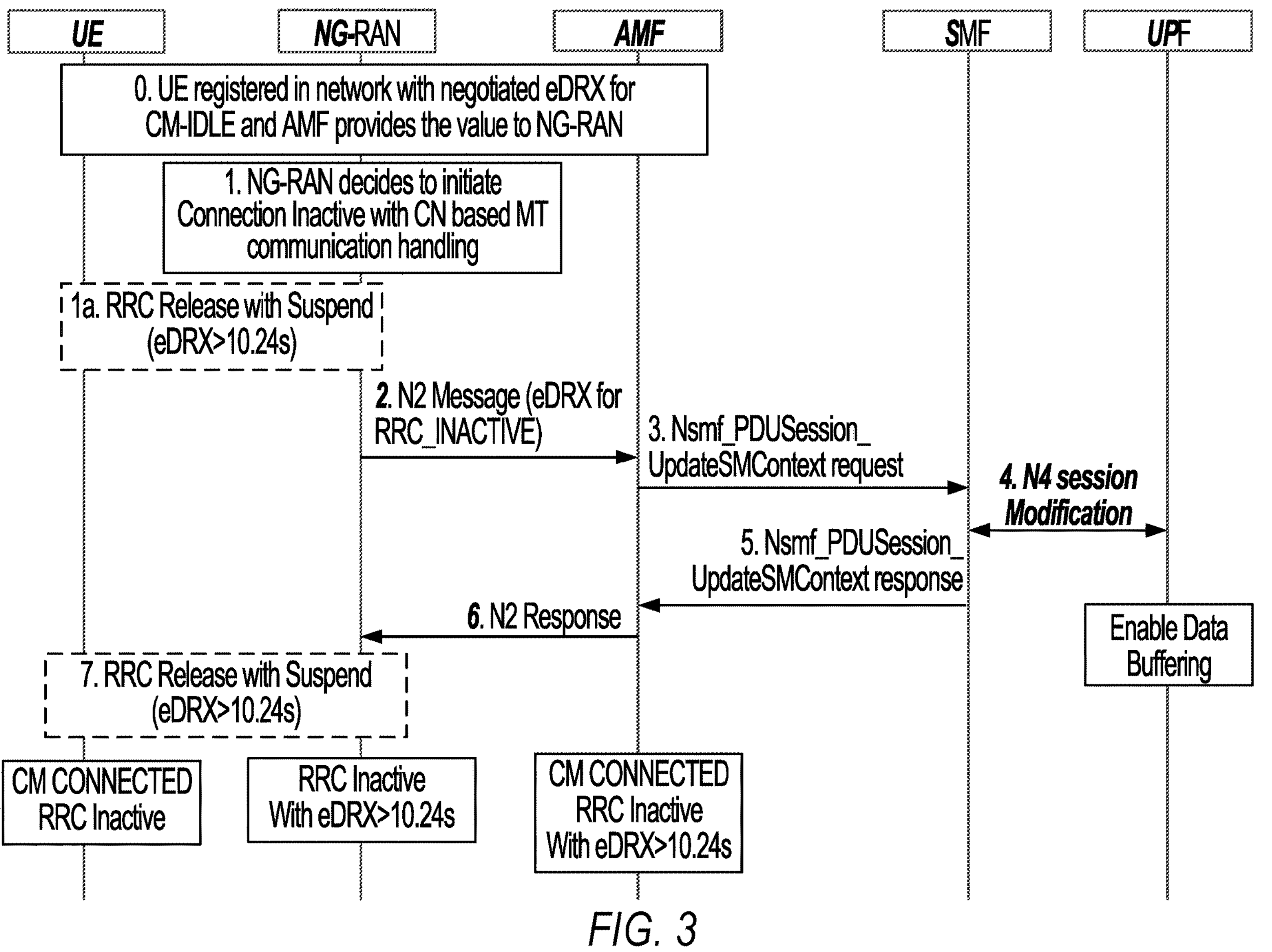
FIG. 3 illustrates a Next Generation Radio Access Network (NG-RAN)-initiated Connection Inactive procedure with core network (CN)-based mobile terminated (MT) communication handling in accordance with some embodiments.
Figure 4:
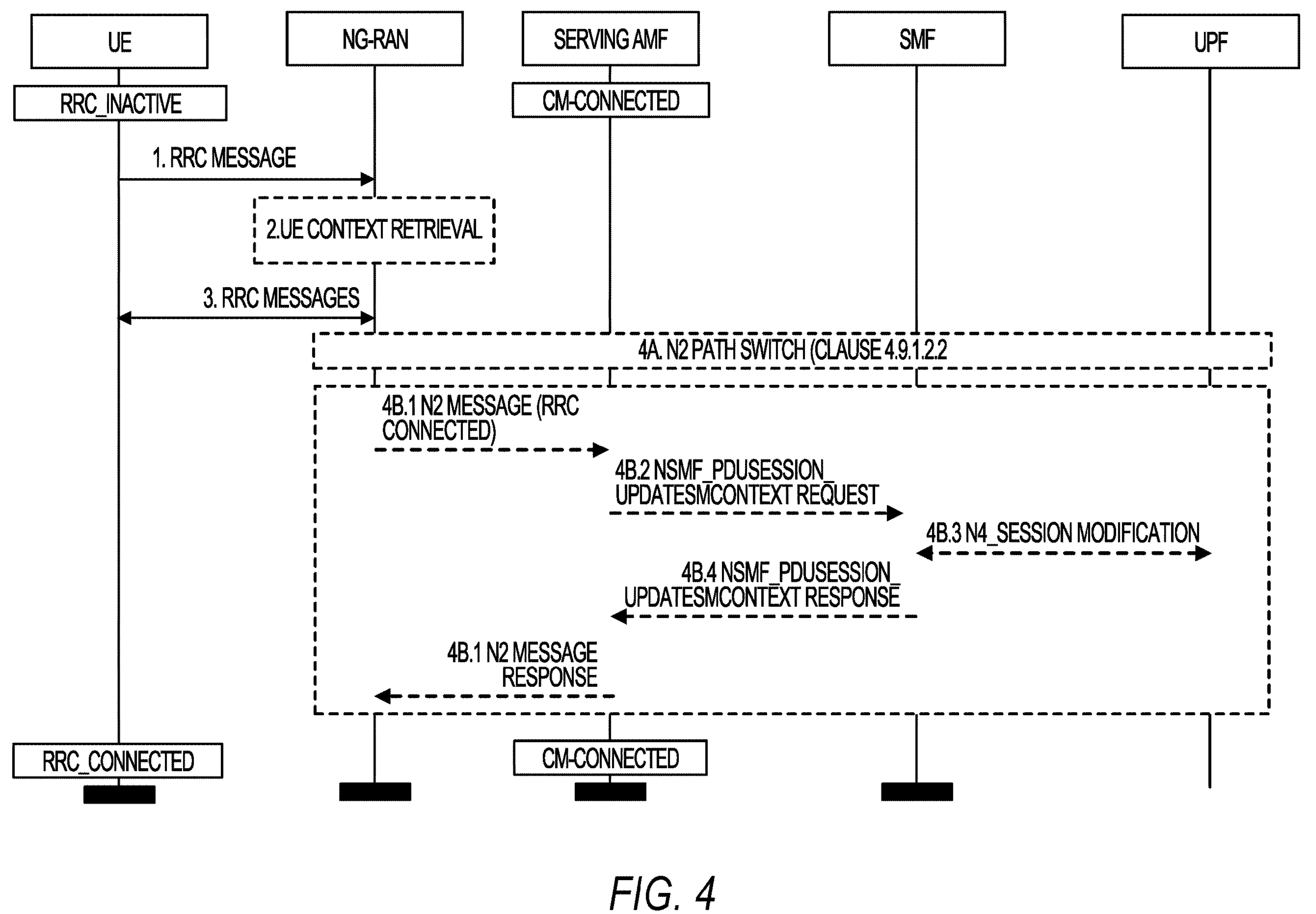
FIG. 4 illustrates a Connection Resume procedure for a UE in an in a Radio Resource Control (RRC)-Inactive state in accordance with some embodiments.
Figure 5:
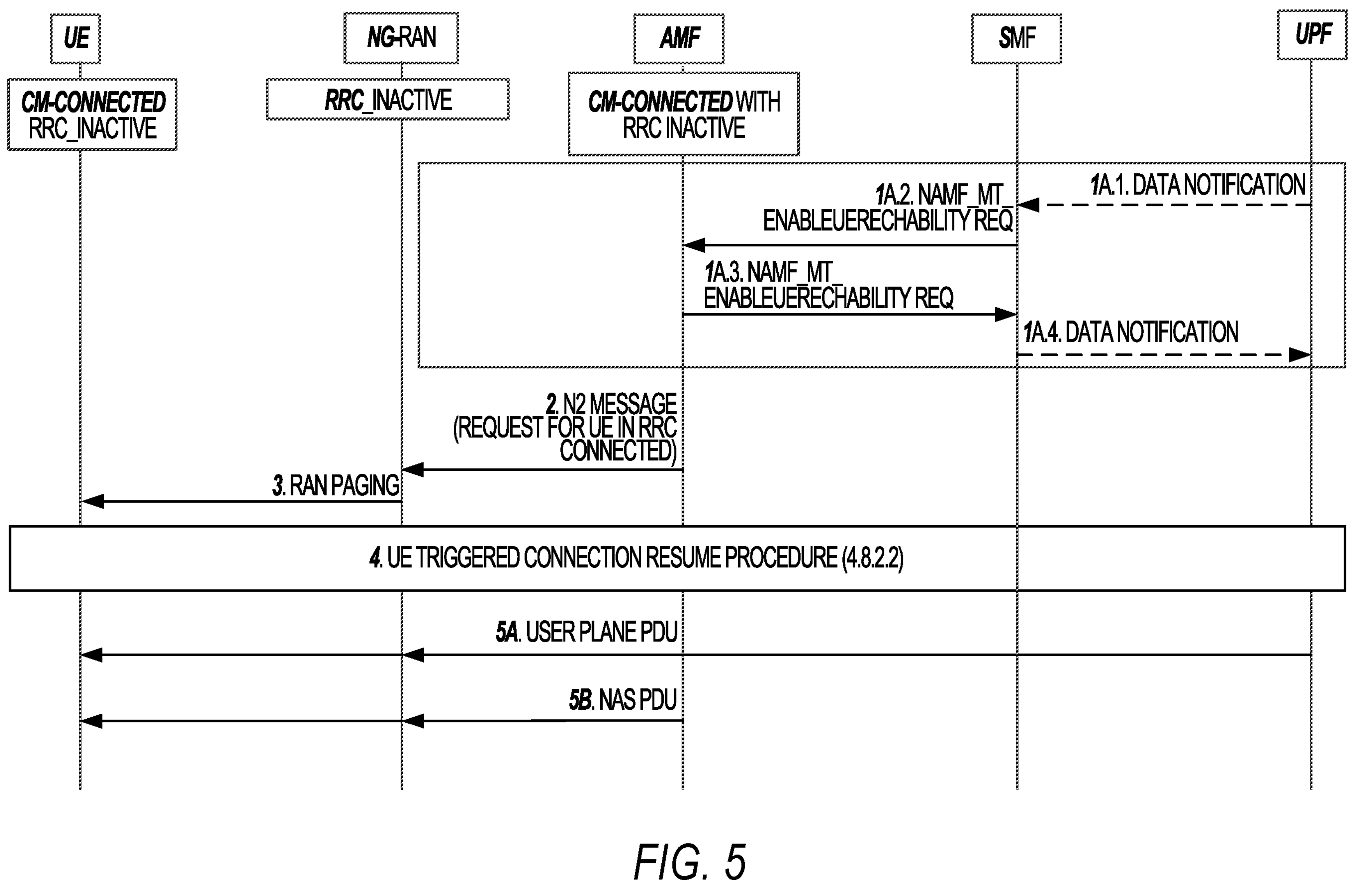
FIG. 5 illustrates a Network Triggered Connection Resume procedure for a UE in an RRC Inactive with CN-based MT communication handling in accordance with some embodiments.

However, in order to support an extended Discontinuous Reception (eDRX) cycle with values on the order of hours, Rel-18 allows the system to buffer data in the UPF while keeping the UE in the CM_Connected state in the CN and RRC_Inactive in the access stratum (AS), in order to better cope for UE mobility. The buffering in the UPF for each of the UE's packet data unit (PDU) sessions with activated user plane resources is started or stopped based on a request from the RAN. Various procedures are shown in FIGS. 3-5 in which: FIG. 3 illustrates a NG-RAN-initiated Connection Inactive procedure with CN-based MT communication handling in accordance with some embodiments; FIG. 4 illustrates a Connection Resume procedure for a UE in an in an RRC-Inactive state in accordance with some embodiments; and FIG. 5 illustrates a Network Triggered Connection Resume procedure for a UE in an RRC Inactive with CN-based MT communication handling in accordance with some embodiments.

In FIG. 3, at operation 0, the UE is registered in the network with negotiated eDRX parameters for the CM-IDLE state and is in the CM-CONNECTED with RRC_CONNECTED state. The AMF provides the eDRX cycle value for the CM-IDLE state to the NG-RAN as part of the RRC Inactive Assistance Information as defined in clause 5.3.3.2.5 of TS 23.501.

At operation 1, the NG-RAN determines the eDRX cycle value for the UE in the RRC_INACTIVE state and decides to initiate Connection Inactive with the CN-based MT communication handling as specified in clause 5.31.7.2.4 of TS 23.501.

At operation 1a, optionally the NG-RAN may initiate a state transition from RRC_CONNECTED to RRC_INACTIVE with an RRC configuring eDRX value as specified in TS 38.300. The NG-RAN may send the request in operation 2 towards the CN immediately following operation 1a or the NG-RAN may delay this request towards CN as specified in clause 5.31.7.2.1 of TS 23.501.

At operation 2, either immediately following operation 1a or after having delayed the request for the NG-RAN based on implementation, the NG-RAN sends an N2 MT Communication Handling request message to the AMF indicating the UE is transitioning to the RRC_INACTIVE state. The CN takes the NG-RAN request into consideration and handles MT communication. The NG-RAN also provides the eDRX cycle value for the RRC_INACTIVE state to the AMF. If the NG-RAN receives a downlink (DL) non-access stratum (NAS) message and the UE is in the RRC_INACTIVE state with an RRC-configured eDRX cycle and is considered not reachable, the NG-RAN indicates to the AMF a NAS non-delivery and then initiates for the CN to handle MT communication.

At operation 3, for each of the PDU sessions with user plane resources that have been activated, the AMF invokes a Nsmf_PDUSession_UpdateSMContext Request (PDU Session ID, Cause, Operation type, User Location Information, Age of Location Information, N2 SM Information (Secondary RAT usage data), CN-based MT handling indication) towards the SMF. The Operation Type is set to a value that indicates to stop user plane DL data transmissions towards the UE and enable data buffering. The SMF starts data buffering for MT data if the data buffering is handled in the SMF.

At operation 4, if data buffering is handled in the UPF, the SMF updates the UPF with proper rules for MT data handling.

At operation 5, The SMF sends the Nsmf_PDUSession_UpdateSMContext response.

At operation 6, The AMF sends an N2 MT Communication Handling response message to the NG-RAN acknowledging the NG-RAN request and indicating that the AMF has taken the NG-RAN request into account. The AMF considers the UE is in CM-CONNECTED with RRC_INACTIVE state.

At operation 7, if the UE connection is not released as specified in operation 1a, the NG-RAN initiates a state transition from RRC_CONNECTED to RRC_INACTIVE with RRC configuring the eDRX cycle value as specified in TS 38.300.

When the Rel-18 functionality for CN buffering for a UE in RRC_Inactive state was defined, the interaction with the Small Data Transmission (SDT) feature was not considered (SDT is defined in TS 38.300). One feature of SDT is that it allows for small data transmission to or from a UE in the RRC_Inactive state without any change to the UE's RRC state. The decision for keeping the UE in the RRC_Inactive state after the transmission of data or moving the UE to the RRC_Connected state is a local decision made by the RAN and is completely transparent to the CN.

During SDT, data can be restricted to certain radio bearers (RBs); that is, only data for these configured RBs (e.g., user data of Quality of Service (QoS) Flows mapped to these RBs) are able to be exchanged during an SDT session. This kind of data is referred as "SDT data" and these configured RBs are referred to as "SDT RBs". These RBs are configured for SDT operation by the gNB to the UE via an RRCRelease message. Rel-17 defined mobile originated SDT (MO-SDT), and Rel-18 introduces mobile terminated SDT (MT-SDT). MT-SDT is able to configure an identical set or different set of RBs than MO-SDT, where the data from only the MT-SDT configured RBs trigger the gNB to page the UE for MT-SDT operation. On reception of a page with an MT-SDT indication, the UE initiates an MT-SDT session. Data on any of the RBs other than SDT RBs may use a legacy resume procedure and the UE is moved to the RRC_Connected state.

RBs are only visible to the RAN and the UE AS. The mapping of data to an RB is only decided by, and visible in, the RAN. SDT operation itself is also transparent to the CN. Hence the CN does not know whether or not the data for the UE belongs to an SDT RB.

In FIG. 4, the Connection Resume procedure is used by the UE to perform an RRC_INACTIVE to RRC_CONNECTED state transition. Triggers for the UE to initiate this procedure are defined in clause 5.3.3.2.5 of TS 23.501.

At operation 1, the UE sends an RRC message (Resume ID) to the NG-RAN. The UE initiates the transition from the RRC_INACTIVE state to RRC_CONNECTED state, see TS 38.300. The UE provides its Resume ID used by the NG-RAN to access the UE's stored Context.

At conditional operation 2, the NG-RAN performs UE Context Retrieval. UE Context Retrieval is performed when the UE Context associated with the UE attempting to resume its connection is not locally available at the accessed NG-RAN. The UE Context Retrieval procedure via NG-RAN is specified in TS 38.300.

At operation 3, the NG-RAN sends RRC messages to the UE. The NG-RAN confirms to the UE that the UE has entered the RRC_CONNECTED state and RRC connection is resumed, see clause 9.2.2.4.1 of TS 38.300.

At conditional operation 4a, an N2 Path switch procedure is applied. If the accessed NG-RAN is able to retrieve the UE Context, the accessed NG-RAN node initiates N2 Path Switch procedure, i.e., operations 1 to 8 of clause 4.9.1.2.2 and including Xn data forwarding. If the Connection Resume procedure is a response to RAN paging which is triggered by the 5GC due to an N2 interface procedure, the NG-RAN and 5GC handle the N2 interface procedure as a collision described in clause 4.9.1.2.

At conditional operation 4b, an N2 Notification is sent. At operation 4b.1, if the accessed NG-RAN is the same as the NG-RAN that configured the RRC_INACTIVE state and still has the UE context, the NG-RAN sends an N2 Notification to the AMF indicating the UE is in the RRC_CONNECTED state, if an AMF requested N2 Notification (see clause 4.8.3) or Connection Inactive procedure with CN based MT communication handling (see clause 4.8.1.1a) has been performed previously.

At operation 4b.2, the AMF invokes Nsmf_PDUSession-_UpdateSMContext Request towards SMF indicating the Downlink data delivery for each PDU session with active user plane, if the AMF has requested data buffering as described in clause 4.8.1.1a.

At operation 4b.3, the N4 session modification procedure is triggered by the SMF. If data buffering is handled in the UPF, the SMF updates the UPF with appropriate rules to trigger data delivery.

At operation 4b.4, the SMF sends the Nsmf_PDUSession_UpdateSMContext response.

At operation 4b.5, the AMF sends the N2 response to the NG-RAN.

In FIG. 5, when the UE is in the CM-CONNECTED state with RRC_INACTIVE state with CN-based MT communication handling, high latency communication as described in clause 5.31.8 of TS 23.501 is applied. This procedure may be triggered by MT data, or a N1 procedure from the SMF and UPF. During the procedure, the NG-RAN performs RAN paging towards the UE based on the N2 message from the AMF in order to trigger the UE triggered Connection Resume procedure in clause 4.8.2.2.

At operation 1a, when downlink data is received and the SMF/UPF is requested to perform buffering as specified in clause 4.8.1.1a, the UPF/SMF checks with AMF for the possibility of data delivery, similar to step 2 of clause 4.24.2 with the following differences:

The AMF determines if the UE is reachable based on the stored eDRX cycle value for the RRC_INACTIVE state provided by the NG-RAN in clause 4.8.1.1a. If the UE is unreachable, the AMF provides the Estimated Maximum Wait time in the response message based on the eDRX cycle value for the RRC_INACTIVE state in the AMF (operations 2-5 are skipped). If the UE is considered reachable, operation 2 is triggered.

At operation 2, the AMF sends an N2 message to the NG-RAN with the request for the UE to be transitioned to the RRC_CONNECTED state.

At operation 3, the NG-RAN performs RAN paging towards the UE.

At operation 4, when the UE receives RAN paging, the UE initiates the UE triggered Connection Resume procedure and the NG-RAN notifies the CN as specified in clause 4.8.2.2 including the N2 Notification in step 3b.

At operation 5, the UPF triggers downlink data delivery if there is any. The AMF sends downlink NAS messages if there are any.

As shown in FIG. 4, upon connection resumption triggered by the UE, at the end of the call flow the UE is moved to the RRC_Connected state. However, if the connection resumption was triggered due to SDT, then the UE should logically be kept in the RRC_Inactive state and the decision for doing so should be made by the RAN (which is configured to determine whether or not the uplink data is SDT, based on the underlying radio bearer/QoS Flow identifier). This is similar to the procedure shown in FIG. 5, which recursively references FIG. 4 and thus leads the UE to always move to the RRC_Connected state at the end of the procedure for connection resumption.

Figure 6:
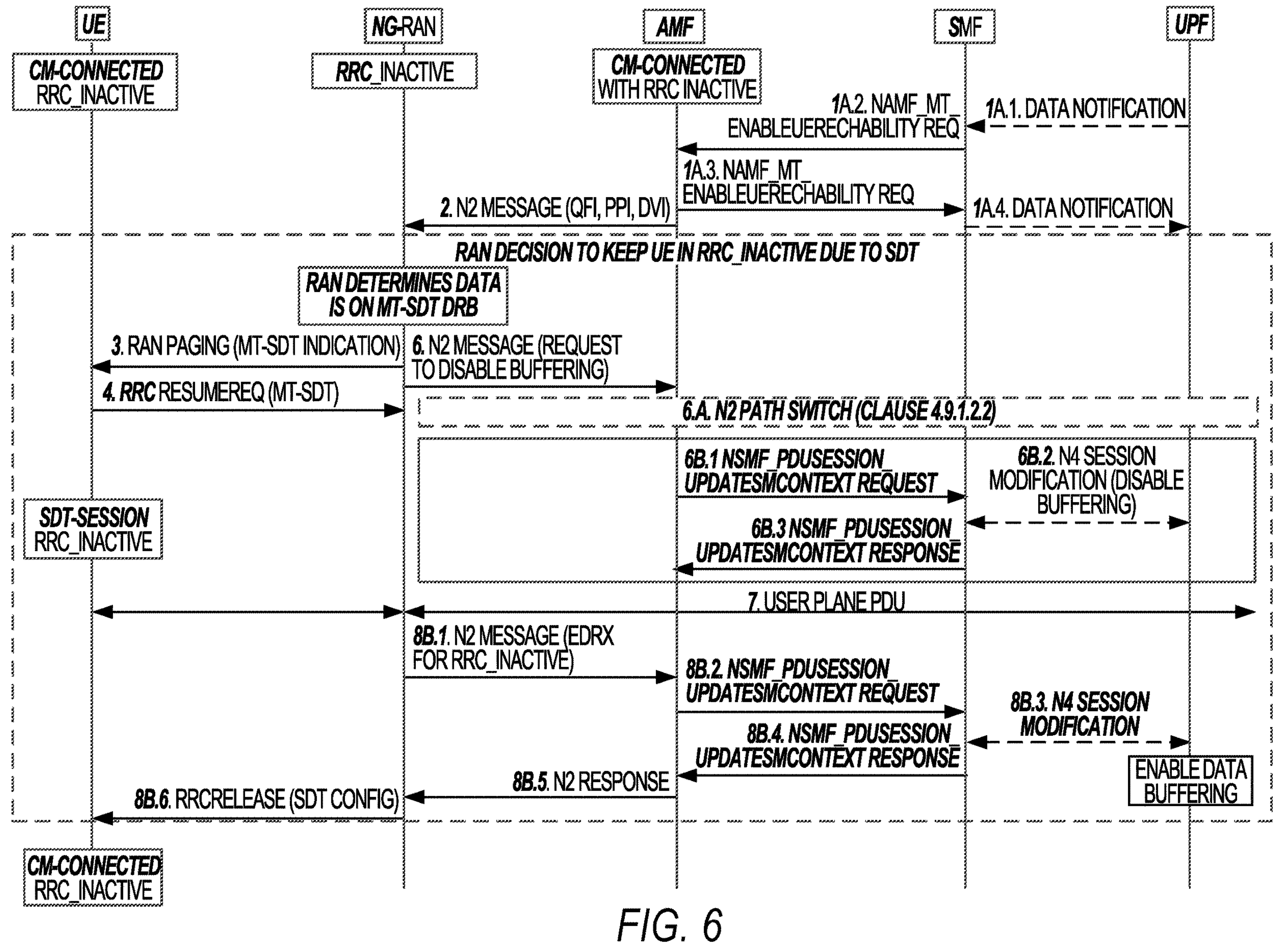
FIG. 6 illustrates a Network Triggered Connection Resume procedure for a UE in an RRC Inactive with CN-based MT communication handling in accordance with some embodiments.

Co-existence between SDT and the Rel-18 functionality for CN-based buffering for a UE in the RRC_Inactive state is described herein. It is assumed herein that the N2 message (also referred to as a N2 DL Data Notification message) that indicates the presence of buffered data in the UPF includes information about the QoS flow of the data and potentially also information of the amount of data available for the corresponding QoS flow that is triggering the resumption of the connection. Based on this information, the RAN determines whether or not the resumption is triggered for SDT, i.e., the RAN determines whether to trigger paging with an MT-SDT indication for the given UE. FIG. 6 illustrates a Network Triggered Connection Resume procedure for a UE in an RRC_Inactive with CN-based MT communication handling in accordance with some embodiments.

At operation 1, upon arrival of the first packet corresponding to a specific Packet Detection Rule (PDR), the UPF sends a Data Notification to SMF (operation 1a.1). The Data Notification includes information about the PDR and may further include the QFI corresponding to the first packet. The Data Notification may also include the Paging Policy Indicator (PPI) that can be used for paging policy differentiation, and the size of the first packet. The SMF sends a Namf_MT_EnableUEReachability request to the AMF (operation 1a.2). The AMF determines that the UE is unreachable (due to the UE being configured for extended idle mode DRX) and sends an MT_EnableUEReachability response to the SMF (operation 1a.3) including an Estimated Maximum Wait time in the response message (used by the UPF for discarding the packet in case of no UE response). The SMF sends a Data Notification response to the UPF (operation 1a.4) including the Maximum Wait time and may also include an indication to the UPF to stop sending further Data Notifications.

At operation 2, when the AMF determines that the UE has become reachable, the AMF sends an N2 message to the NG-RAN. The N2 message indicates the presence of buffered data in the CN and includes information associated with the DL data currently buffered by CN. This information included in N2 message may be, e.g., the QFI, PPI, and the size of the first downlink packet that is in CN buffers associated with the given QoS flow (Data Volume Indication (DVI) in FIG. 6). Based on this information, the NG-RAN determines whether or not the resumption is triggered for SDT. This is done based on the QoS Flow ID received from the CN, the size of the first packet in the CN buffers, the QoS Flow to data resource bearer (DRB) mapping available in the gNB along with the information of which RBs are configured for MT-DRB. If the QoS flow is mapped to an MT-SDT DRB, the NG-RAN determines that the connection resumption is triggered due to SDT.

At operation 3, the NG-RAN pages the UE using a paging message with an MT-SDT indication.

At operation 4, on receipt of the paging message with the MT-SDT indication, the UE may initiate an SDT session by sending a RRCResumeRequest message along with an indication that the UE is responding to an MT-SDT indication in the paging message. The UE continues in the RRC_Inactive state during the SDT session. UL and DL data may be exchanged on SDT RBs during the SDT session.

At operation 6, the NG-RAN requests the CN to release the data from the CN buffer. Note that the request/release is performed even though the UE has not moved to the RRC_Connected state, unlike FIG. 2. This is because an SDT session is ongoing.

At conditional operation 6a, the N2 Path switch procedure is applied similar to the above. At operation 6b.1, the AMF invokes an Nsmf_PDUSession_UpdateSMContext Request towards SMF indicating the Downlink data delivery for each PDU session with active user plane, if the AMF has requested data buffering as described in clause 4.8.1.1a. At operation 6b.2, the N4 session modification procedure is triggered by the SMF. If data buffering is handled in the UPF, the SMF updates the UPF with appropriate rules to trigger data delivery. At operation 6b.3, the SMF sends the Nsmf_PDUSession_UpdateSMContext response.

At operation 7, data on SDT RBs may be exchanged between the UE and the network.

Operations 8b.1-8b.5 are similar to operations 2-6 in FIG. 3. At operation 8b.6, if the NG-RAN determines that the data transfer for SDT is completed, to terminate an SDT session, the NG-RAN may send an RRCRelease message to the UE including a suspendConfig information element (IE). The suspendConfig parameter informs the UE that the UE is to remain in the RRC_Inactive state. The NG-RAN also reactivates CN buffering (assuming INACTIVE eDRX>10.24 sec is still configured) at operation 8b.1. The NG-RAN may also provide an SDT-Config IE as part of the suspendConfig IE if the UE is still allowed to use SDT while in the RRC_INACTIVE state.

If, during the SDT data transfer, the NG-RAN determines that the UE is to be moved to the RRC_Connected state, the NG-RAN may send a RRCResume message to the UE at any time during the SDT session. This triggers a state change to move the UE to the RRC_Connected state. At this time, no additional indication to the CN is required as the request to release the data buffer was already made when SDT session started. The NG-RAN may determine that the UE is to be moved to the RRC_Connected state, for example, due to the duration or the volume of data transfer in SDT, or due to data on a non-SDT RB (i.e., an RB not configured for SDT).

In another embodiment, the NG-RAN may request in advance that the CN is not to prevent the UPF from sending further Data Notifications to the SMF. For example, the NG-RAN may provide this request during the NG-RAN-initiated Connection Inactive procedure with CN-based MT communication handling as in operation 2 of FIG. 3. The request is further conveyed to the SMF (FIG. 3 operation 3) and eventually to the UPF (FIG. 3 operation 4).

By allowing the UPF to send subsequent Data Notifications, the AMF may receive multiple Namf_MT_EnableUEReachability requests from the SMF (FIG. 6 operation 1a.2) while the UE is unreachable. Each request may be associated with a different QoS Flow.

When the AMF determines that the UE has become reachable, the AMF may send several N2 messages (FIG. 6 operation 2) to the NG-RAN. Each N2 message may carry information derived from the corresponding Namf_MT_EnableUEReachability request. Alternatively, the AMF may send a single N2 message including combined information corresponding to the information received in the multiple Namf_MT_EnableUEReachability requests from the SMF.

Based on the received combined information (received in a single or multiple N2 messages), the NG-RAN may determine whether the UE is to be paged for SDT or for normal data (i.e., a normal resume without an MT SDT indication).

Figure 7:
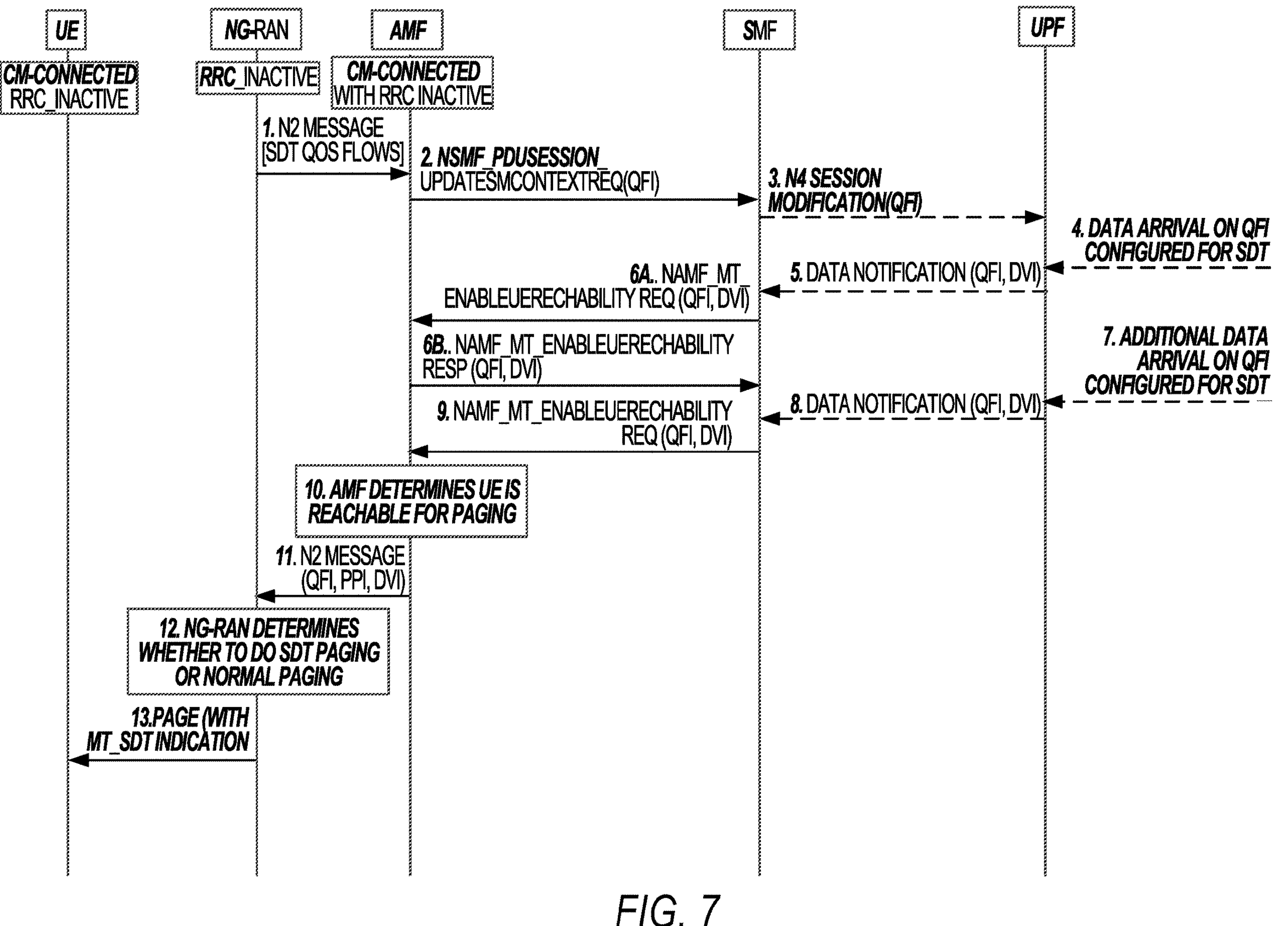
FIG. 7 illustrates a Network Triggered Connection Resume procedure for a UE in an RRC Inactive with CN-based MT communication handling with SDT Quality of Service (QoS) Flow Identifier (QFI) handling in accordance with some embodiments.

FIG. 7 illustrates a Network Triggered Connection Resume procedure for a UE in an RRC_Inactive with CN-based MT communication handling with SDT QFI handling in accordance with some embodiments. In the embodiment shown in FIG. 7, similar to the previous embodiment, the UPF may also include the buffered data volume for each of the QoS flows in subsequent Data Notifications only if requested by the NG-RAN.

At operation 1, the NG-RAN requests buffering in the CN when the UE is in the INACTIVE state with eDRX and SDT. The N2 message is sent from the NG-RAN to the AMF. The NG-RAN may also provide the QFI(s) that are mapped to the SDT DRB in the NG-RAN in the N2 message.

At operations 2 and 3, the QFI information may be passed to the SMF and the UPF. Alternatively, the QFI may also be provided in the Namf_MT_EnableUEReachability response message at operation 6b.

At operations 8 and 9, when more data arrives on the QFI, the UPF may provide another Data notification message to update the buffered data volume. Alternatively, the updated data volume may be provided for all QFIs if requested by the AMF.

In another embodiment, the NG-RAN may indicate to the AMF (which may also inform the UPF) the threshold of data after which SDT mechanism is not to be used. If so, the AMF (and potentially the UPF) may indicate when the threshold is met in general or in relation to the indicated/applicable QFI(s). The indication may be used by the NG-RAN to determine whether the UE is to be paged for SDT or for normal data (i.e., a normal resume without an MT SDT indication).

If the data threshold is used, the AMF may avoid sharing information regarding which QFI has DL data available to be sent to the UE. Similar operations may also be applicable between the AMF to the SMF and the SMF to the UPF. For signaling generated in the AMF, the AMF may directly apply the data volume threshold when indicated when deciding whether or not to indicate paging for SDT.

As above, the QFI is provided in the N2 message for the NG-RAN to apply mapping between radio bearer and QFI indicating SDT. DVI may also be included in the N2 message, as well as PPI. The QFI (and perhaps DVI) sent from the UPF. The NG-RAN may restore buffering after data delivery. The N2 message (also referred to as the RAN paging message) indicating the RRC_Inactive state may also request a continuous data indication from the UPF (when the data comes in)—not merely the first packet.

For connection resumption, if the NG-RAN determines that the connection resume is for SDT and operations 6b.1 to 6b.5 of FIG. 6 have been performed, then the NG-RAN keeps the UE in the RRC_INACTIVE state. If the UE is configured in the RRC_INACTIVE state with an eDRX>10.24s, the NG-RAN may send an N2 message to the 5GC as described in clause 4.8.1.1a operation 2 so the CN can then handle MT communications.

Figure 8:
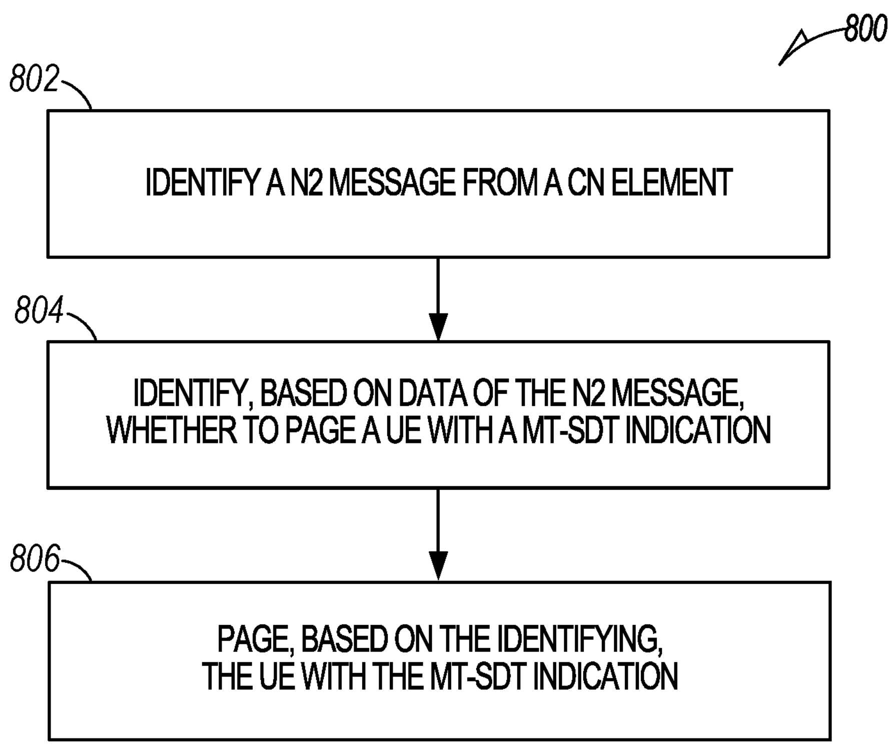
FIG. 8 illustrates a method of paging in accordance with some aspects.

FIG. 8 illustrates a method of paging in accordance with some aspects. In some embodiments, the electronic device(s), network(s), system(s), chip(s) or component(s), or portions or implementations thereof, of the figures herein, may be configured to perform one or more processes, techniques, or methods as described herein, or portions thereof. The process 800 of FIG. 8 may include or relate to a method to be performed by a NG-RAN node, one or more elements of a NG-RAN node, and/or one or more electronic devices that includes and/or implement a NG-RAN node. The process 800 may include identifying, at operation 802 a N2 message from a CN element; identifying, at operation 804 based on data of the N2 message, whether to page a UE with a MT-SDT indication; and paging, at operation 806 based on the identifying, the UE with the MT-SDT indication.

Figure 9:
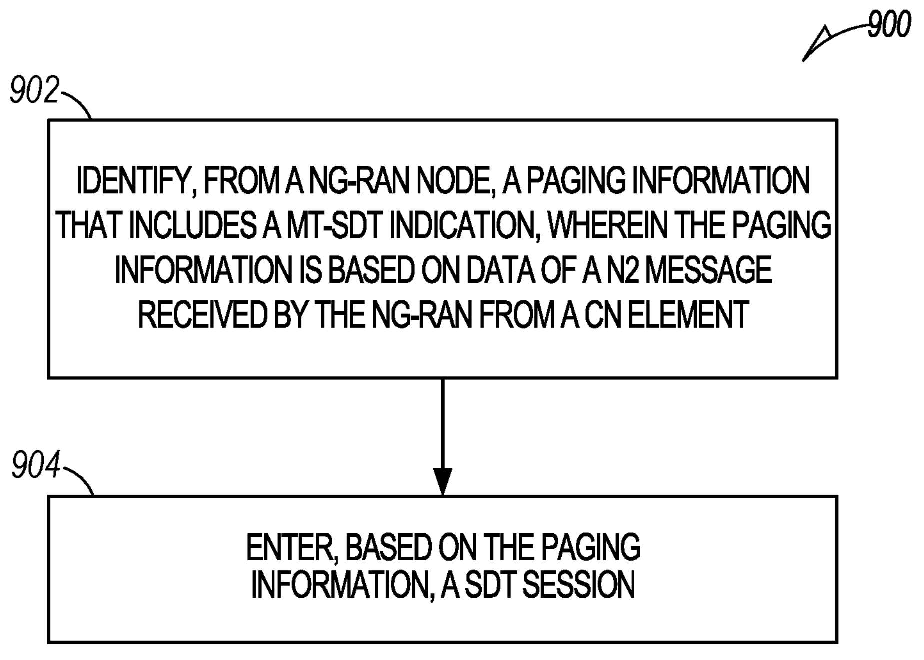
FIG. 9 illustrates a method of entering an SDT session in accordance with some aspects.

FIG. 9 illustrates a method of entering an SDT session in accordance with some aspects. The process 900 of FIG. 9 may include or relate to a method to be performed by a UE, one or more elements of a UE, and/or one or more electronic devices that include and/or implement a UE. The process FIG. 9 may include identifying, at operation 902 from a NG-RAN node, paging information that includes a MT-SDT indication, wherein the paging information is based on data of a N2 message received by the NG-RAN from a CN element; and entering, at operation 904 based on the paging information, a SDT session.

EXAMPLES

Example 1 is an apparatus configured to operate as a next generation radio access network (NG-RAN), the apparatus comprising: memory and processing circuitry to configure the NG-RAN to: receive, from an access and mobility function (AMF) of a core network (CN), a RAN paging message that contains a Quality of Service (QoS) Flow Identifier (QFI) for data buffered in a user plane function (UPF), to be delivered to a user equipment (UE) in a radio resource control (RRC)_Inactive state; determine, based on the QFI, whether to trigger connection resumption for small data transmission (SDT) for the UE; determine, based on the QFI and a QFI-to-data radio bearer (DRB) mapping, whether the data is in a mobile terminated SDT (MT-SDT) DRB; and in response to a determination that the data is in the MT-SDT DRB, keep the UE in the RRC_Inactive state during an SDT session between the UE and the CN is ongoing.

In Example 2, the subject matter of Example 1 includes, wherein the processing circuitry further configures the NG-RAN to, in response to a determination that the data is in the MT-SDT DRB: send, to the UE, a paging message that includes a MT-SDT indication to indicate SDT; and receive, from the UE in response to the paging message, an RRCResumeRequest message with an indication that the paging message included an MT-SDT indication, the RRCResumeRequest message to initiate the SDT session.

In Example 3, the subject matter of Example 2 includes, wherein the processing circuitry further configures the NG- RAN to, in response to reception of the RRCResumeRequest message, send a request to the CN to disable buffering.

In Example 4, the subject matter of Examples 1-3 includes, wherein the processing circuitry further configures the NG-RAN to: determine whether data transfer between the UE and the CN is completed; and in response to a determination that data transfer between the UE and the CN is completed: send, to the UE, an RRCRelease message to terminate the SDT session, the RRCRelease message to terminate the SDT session including a suspendConfig information element (IE) to inform the UE to remain in the RRC_Inactive state; and re-activate CN buffering.

In Example 5, the subject matter of Examples 1~4 includes, wherein the processing circuitry further configures the NG-RAN to: determine that the UE is to be moved to an RRC_Connected state; and in response to a determination that the UE is to be moved to the RRC_Connected state, send, to the UE, a RRCResume message during the SDT session.

In Example 6, the subject matter of Examples 1-5 includes, wherein the processing circuitry further configures the NG-RAN to, prior to the data being buffered in the UPF, send a request to the AMF that, for a selected QFI, the CN is not to prevent the UPF from sending data notifications to a session management function (SMF) after a data notification associated with the data.

In Example 7, the subject matter of Example 6 includes, wherein the processing circuitry further configures the NG-RAN to provide the request during a NG-RAN-initiated Connection Inactive procedure with CN-based MT communication handling.

In Example 8, the subject matter of Examples 6-7 includes, wherein the processing circuitry further configures the NG-RAN to, after transmission of the request: receive, from the AMF, RAN paging messages each carrying information derived from a corresponding Namf_MT_EnableUEReachability request to the AMF from a session management function (SMF); and in response to reception of the RAN paging messages select among paging the UE for SDT and paging the UE for normal data.

In Example 9, the subject matter of Examples 6-8 includes, wherein the processing circuitry further configures the NG-RAN to, after transmission of the request: receive, from the AMF, a single RAN paging message carrying information derived from multiple Namf_MT_EnableUEReachability requests to the AMF from a session management function (SMF); and in response to reception of the single RAN paging message, select among paging the UE for SDT and paging the UE for normal data.

In Example 10, the subject matter of Examples 1-9 includes, wherein the processing circuitry further configures the NG-RAN to, prior to the data being buffered in the UPF: send a request for buffering in a core network (CN) when the UE is in the RRC_Inactive state with extended discontinuous reception (eDRX) and SDT; receive a single RAN paging message carrying information derived from multiple Namf_MT_EnableUEReachability requests to the AMF from a session management function (SMF) after the UE is determined to be reachable based on an eDRX cycle, each Namf_MT_EnableUEReachability request associated with a corresponding data notification from the UPF to the SMF indicating arrival of additional data on a QFI configured for SDT to update a buffered data volume; and in response to reception of the single RAN paging message select among paging the UE for SDT and paging the UE for normal data.

In Example 11, the subject matter of Example 10 includes, wherein the request includes QFIs mapped to SDT-DRBs in the NG-RAN.

In Example 12, the subject matter of Examples 1-11 includes, wherein the RAN paging message further includes a Data Volume Indication (DVI) that indicates a size of the data buffered in the UPF.

In Example 13, the subject matter of Examples 1-12 includes, wherein the RAN paging message further includes a Data Volume Indication (DVI) that indicates a size of a first packet of the data buffered in the UPF.

In Example 14, the subject matter of Examples 1-13 includes, wherein the RAN paging message further includes a Paging Policy Indicator (PPI) for paging policy differentiation.

In Example 15, the subject matter of Examples 1-14 includes, wherein the processing circuitry further configures the NG-RAN to: send an N2 message to release CN buffering while the SDT session is ongoing and the UE is still in the RRC_Inactive state; and send another N2 message to enable the CN buffering when the SDT session is complete and UE remains in the RRC_Inactive state.

In Example 16, the subject matter of Examples 1-15 includes, wherein the processing circuitry further configures the NG-RAN to: send an N2 message to release CN buffering while the SDT session is ongoing and the UE is still in the RRC_Inactive state; determine during the SDT session that the UE is to move to an RRC_Connected state; and in response to a determination during the SDT session that the UE is to move to an RRC_Connected state, avoid transmission of another N2 message to enable the CN buffering when the SDT session is complete.

Example 17 is an apparatus configured to operate as an access and mobility function (AMF) of a core network (CN), the apparatus comprising: memory and processing circuitry to configure the AMF to: receive, from a session management function (SMF), a Namf_MT_EnableUEReachability request for a user equipment (UE) in an RRC_Inactive state with extended discontinuous reception (eDRX), the Namf_MT_EnableUEReachability request containing a Quality of Service (QoS) Flow Identifier (QFI) for data buffered in a user plane function (UPF) of the CN, to be delivered to the UE; determine whether the UE is reachable based on an eDRX cycle; in response to a determination that the UE is reachable, send, to a next generation radio access network (NG-RAN), a RAN paging message that contains the QFI; in response to transmission of the RAN paging message, receive, from the NG-RAN, a request to disable buffering of data by the CN; and in response to reception of the request, transmit, to the SMF, a Nsmf_PDUSession_UpdateSMContext Request to disable the buffering of data by the UPF.

In Example 18, the subject matter of Example 17 includes, wherein the processing circuitry further configures the NG-RAN to: receive, from the NG-RAN prior to reception of the Namf_MT_EnableUEReachability request, an N2 message indicating that, for a selected QFI, the CN is not to prevent the UPF from sending, while the UE is in the RRC_Inactive state, a subsequent data notification associated with subsequent reception of data for the UE by the UPF after transmission of a data notification associated with the data; send, to the SMF, a Nsmf_PDUSession_UpdateSMContext Request associated with the N2 message; and for each subsequent reception of data by the UPF, one of: receive, from the SMF, a first subsequent Namf_MT_EnableUEReachability request including a first subsequent QFI corresponding to the subsequent reception of data, and send, in response to a determination that the UE is reachable based on the eDRX cycle, a RAN paging message including the subsequent QFI, or receive, from the SMF, a second subsequent Namf_MT_EnableUEReachability request including a second subsequent QFI and data volume corresponding to the subsequent reception of data; and send, in response to a determination that the UE is reachable based on the eDRX cycle, a single RAN paging message including each subsequent QFI and data volume.

Example 19 is a computer-readable storage medium that stores instructions for execution by one or more processors of a next generation radio access network (NG-RAN), the one or more processors to configure the NG-RAN to, when the instructions are executed: receive, from an access and mobility function (AMF) of a core network (CN), a RAN paging message that contains a Quality of Service (QoS) Flow Identifier (QFI) and a Data Volume Indication (DVI) that indicates a size of data buffered in a user plane function (UPF), to be delivered to a user equipment (UE) in a radio resource control (RRC)_Inactive state; determine, based on the QFI and DVI, whether to trigger connection resumption for small data transmission (SDT) for the UE; determine, based on the QFI and a QFI-to-data radio bearer (DRB) mapping, whether the data is in a mobile terminated SDT (MT-SDT) DRB; and in response to a determination that the data is in the MT-SDT DRB, keep the UE in the RRC_Inactive state during an SDT session between the UE and the CN is ongoing.

In Example 20, the subject matter of Example 19 includes, wherein the instructions, when executed, configure the NG-RAN to, in response to a determination that the data is in the MT-SDT DRB: send, to the UE, a paging message that includes a MT-SDT indication to indicate SDT; and receive, from the UE in response to the paging message, an RRCResumeRequest message with an indication that the paging message included an MT-SDT indication, the RRCResumeRequest message to initiate the SDT session.

Example 21 is at least one machine-readable medium including instructions that, when executed by processing circuitry, cause the processing circuitry to perform operations to implement of any of Examples 1-20.

Example 22 is an apparatus comprising means to implement of any of Examples 1-20.

Example 23 is a system to implement of any of Examples 1-20.

Example 24 is a method to implement of any of Examples 1-20.

Although an embodiment has been described with reference to specific example embodiments, it will be evident that various modifications and changes may be made to these embodiments without departing from the broader scope of the present disclosure. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

The subject matter may be referred to herein, individually and/or collectively, by the term "embodiment" merely for convenience and without intending to voluntarily limit the scope of this application to any single inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

In this document, the terms "a" or "an" are used, as is common in patent documents, to indicate one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, UE, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects. As indicated herein, although the term "a" is used herein, one or more of the associated elements may be used in different embodiments. For example, the term "a processor" configured to carry out specific operations includes both a single processor configured to carry out all of the operations as well as multiple processors individually configured to carry out some or all of the operations (which may overlap) such that the combination of processors carry out all of the operations. Further, the term "includes" may be considered to be interpreted as "includes at least" the elements that follow.

The Abstract of the Disclosure is submitted with the understanding that it will not be used to interpret or limit the scope or meaning of the claims. In addition, in the foregoing Detailed Description, it may be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. An apparatus configured to operate as a next generation radio access network (NG-RAN), the apparatus comprising:

memory and processing circuitry to configure the NG-RAN to:

receive, from an access and mobility function (AMF) of a core network (CN), a RAN paging message that contains a Quality of Service (QOS) Flow Identifier (QFI) for data buffered in a user plane function (UPF), to be delivered to a user equipment (UE) in a radio resource control (RRC)_Inactive state;

determine, based on the QFI, whether to trigger connection resumption for small data transmission (SDT) for the UE;

determine, based on the QFI and a QFI-to-data radio bearer (DRB) mapping, whether the data is in a mobile terminated SDT (MT-SDT) DRB; and in response to a determination that the data is in the MT-SDT DRB, keep the UE in the RRC_Inactive state during an SDT session between the UE and the CN is ongoing.

2. The apparatus of claim 1, wherein the processing circuitry further configures the NG-RAN to, in response to a determination that the data is in the MT-SDT DRB:

send, to the UE, a paging message that includes a MT-SDT indication to indicate SDT; and receive, from the UE in response to the paging message, an RRCResumeRequest message with an indication that the paging message included an MT-SDT indication, the RRCResumeRequest message to initiate the SDT session.

3. The apparatus of claim 2, wherein the processing circuitry further configures the NG-RAN to, in response to reception of the RRCResumeRequest message, send a request to the CN to disable buffering.

4. The apparatus of claim 1, wherein the processing circuitry further configures the NG-RAN to:

determine whether data transfer between the UE and the CN is completed; and in response to a determination that data transfer between the UE and the CN is completed:

send, to the UE, an RRCRelease message to terminate the SDT session, the RRCRelease message to terminate the SDT session including a suspendConfig information element (IE) to inform the UE to remain in the RRC_Inactive state; and re-activate CN buffering.

5. The apparatus of claim 1, wherein the processing circuitry further configures the NG-RAN to:

determine that the UE is to be moved to an RRC Connected state; and in response to a determination that the UE is to be moved to the RRC_Connected state, send, to the UE, a RRCResume message during the SDT session.

6. The apparatus of claim 1, wherein the processing circuitry further configures the NG-RAN to, prior to the data being buffered in the UPF, send a request to the AMF that, for a selected QFI, the CN is not to prevent the UPF from sending data notifications to a session management function (SMF) after a data notification associated with the data.

7. The apparatus of claim 6, wherein the processing circuitry further configures the NG-RAN to provide the request during a NG-RAN-initiated Connection Inactive procedure with CN-based MT communication handling.

8. The apparatus of claim 6, wherein the processing circuitry further configures the NG-RAN to, after transmission of the request:

receive, from the AMF, RAN paging messages each carrying information derived from a corresponding Namf_MT_EnableUEReachability request to the AMF from a session management function (SMF); and in response to reception of the RAN paging messages select among paging the UE for SDT and paging the UE for normal data.

9. The apparatus of claim 6, wherein the processing circuitry further configures the NG-RAN to, after transmission of the request:

receive, from the AMF, a single RAN paging message carrying information derived from multiple Namf_MT_EnableUEReachability requests to the AMF from a session management function (SMF); and in response to reception of the single RAN paging message, select among paging the UE for SDT and paging the UE for normal data.

10. The apparatus of claim 1, wherein the processing circuitry further configures the NG-RAN to, prior to the data being buffered in the UPF:

send a request for buffering in a core network (CN) when the UE is in the RRC_Inactive state with extended discontinuous reception (eDRX) and SDT;

receive a single RAN paging message carrying information derived from multiple Namf_MT_EnableUEReachability requests to the AMF from a session management function (SMF) after the UE is determined to be reachable based on an eDRX cycle, each Namf_MT_EnableUEReachability request associated with a corresponding data notification from the UPF to the SMF indicating arrival of additional data on a QFI configured for SDT to update a buffered data volume; and in response to reception of the single RAN paging message, select among paging the UE for SDT and paging the UE for normal data.

11. The apparatus of claim 10, wherein the request includes QFIs mapped to SDT- DRBs in the NG-RAN.

12. The apparatus of claim 1, wherein the RAN paging message further includes a Data Volume Indication (DVI) that indicates a size of the data buffered in the UPF.

13. The apparatus of claim 1, wherein the RAN paging message further includes a Data Volume Indication (DVI) that indicates a size of a first packet of the data buffered in the UPF.

14. The apparatus of claim 1, wherein the RAN paging message further includes a Paging Policy Indicator (PPI) for paging policy differentiation.

15. The apparatus of claim 1, wherein the processing circuitry further configures the NG-RAN to:

send an N2 message to release CN buffering while the SDT session is ongoing and the UE is still in the RRC_Inactive state; and send another N2 message to enable the CN buffering when the SDT session is complete and UE remains in the RRC Inactive state.

16. The apparatus of claim 1, wherein the processing circuitry further configures the NG-RAN to:

send an N2 message to release CN buffering while the SDT session is ongoing and the UE is still in the RRC_Inactive state;

determine during the SDT session that the UE is to move to an RRC_Connected state; and in response to a determination during the SDT session that the UE is to move to an RRC_Connected state, avoid transmission of another N2 message to enable the CN buffering when the SDT session is complete.

17. An apparatus configured to operate as an access and mobility function (AMF) of a core network (CN), the apparatus comprising:

memory and processing circuitry to configure the AMF to:

receive, from a session management function (SMF), a Namf_MT_EnableUEReachability request for a user equipment (UE) in an RRC Inactive state with extended discontinuous reception (eDRX), the Namf_MT_EnableUEReachability request containing a Quality of Service (QOS) Flow Identifier (QFI)

for data buffered in a user plane function (UPF) of the CN, to be delivered to the UE;

determine whether the UE is reachable based on an eDRX cycle;

in response to a determination that the UE is reachable, send, to a next generation radio access network (NG-RAN), a RAN paging message that contains the QFI;

in response to transmission of the RAN paging message, receive, from the NG-RAN, a request to disable buffering of data by the CN; and in response to reception of the request, transmit, to the SMF, a Nsmf_PDUSession_UpdateSMContext Request to disable the buffering of data by the UPF.

18. The apparatus of claim 17, wherein the processing circuitry further configures the NG-RAN to:

receive, from the NG-RAN prior to reception of the Namf_MT_EnableUEReachability request, an N2 message indicating that, for a selected QFI, the CN is not to prevent the UPF from sending, while the UE is in the RRC_Inactive state, a subsequent data notification associated with subsequent reception of data for the UE by the UPF after transmission of a data notification associated with the data;

send, to the SMF, a Nsmf_PDUSession_UpdateSMContext Request associated with the N2message; and for each subsequent reception of data by the UPF, one of:

receive, from the SMF, a first subsequent Namf_MT_EnableUEReachability request including a first subsequent QFI corresponding to the subsequent reception of data, and send, in response to a determination that the UE is reachable based on the eDRX cycle, a RAN paging message including the subsequent QFI, or receive, from the SMF, a second subsequent Namf_MT_EnableUEReachability request including a second subsequent QFI and data volume corresponding to the subsequent reception of data; and send, in response to a determination that the UE is reachable based on the eDRX cycle, a single RAN paging message including each subsequent QFI and data volume.

19. A computer-readable storage medium that stores instructions for execution by one or more processors of a next generation radio access network (NG-RAN), the one or more processors to configure the NG-RAN to, when the instructions are executed:

receive, from an access and mobility function (AMF) of a core network (CN), a RAN paging message that contains a Quality of Service (QOS) Flow Identifier (QFI) and a Data Volume Indication (DVI) that indicates a size of data buffered in a user plane function (UPF), to be delivered to a user equipment (UE) in a radio resource control (RRC)_Inactive state;

determine, based on the QFI and DVI, whether to trigger connection resumption for small data transmission (SDT) for the UE;

determine, based on the QFI and a QFI-to-data radio bearer (DRB) mapping, whether the data is in a mobile terminated SDT (MT-SDT) DRB; and in response to a determination that the data is in the MT-SDT DRB, keep the UE in the RRC_Inactive state during an SDT session between the UE and the CN is ongoing.

20. The medium of claim 19, wherein the instructions, when executed, configure the NG-RAN to, in response to a determination that the data is in the MT-SDT DRB:

send, to the UE, a paging message that includes a MT-SDT indication to indicate SDT; and receive, from the UE in response to the paging message, an RRCResumeRequest message with an indication that the paging message included an MT-SDT indication, the RRCResumeRequest message to initiate the SDT session.

* * * * *